(12) United States Patent
Fujishiro et al.

(10) Patent No.: US 11,265,132 B2
(45) Date of Patent: Mar. 1, 2022

(54) ENHANCING UTILIZATION EFFICIENCY OF RADIO RESOURCES IN MBMS

(71) Applicant: KYOCERA CORPORATION, Kyoto (JP)

(72) Inventors: Masato Fujishiro, Yokohama (JP); Kugo Morita, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 180 days.

(21) Appl. No.: 16/334,497

(22) PCT Filed: Sep. 12, 2017

(86) PCT No.: PCT/JP2017/032769
§ 371 (c)(1),
(2) Date: Mar. 19, 2019

(87) PCT Pub. No.: WO2018/056108
PCT Pub. Date: Mar. 29, 2018

(65) Prior Publication Data
US 2020/0204329 A1    Jun. 25, 2020

Related U.S. Application Data

(60) Provisional application No. 62/397,459, filed on Sep. 21, 2016.

(51) Int. Cl.
*H04L 5/00*      (2006.01)
*H04L 1/18*      (2006.01)
(Continued)

(52) U.S. Cl.
CPC .......... *H04L 5/0055* (2013.01); *H04L 1/1825* (2013.01); *H04L 1/1864* (2013.01);
(Continued)

(58) Field of Classification Search
CPC ... H04L 5/0055; H04L 1/1825; H04L 1/1864; H04L 5/0007; H04W 4/06;
(Continued)

(56) References Cited

U.S. PATENT DOCUMENTS 8,068,511 B2   11/2011   Reznik et al.
9,391,735 B2    7/2016   Reznik et al.
(Continued)

FOREIGN PATENT DOCUMENTS

JP   2014-045526 A      3/2014
JP   2015014021 A  *   1/2015   ............. B03C 1/025
(Continued)

*Primary Examiner* — Ian N Moore
*Assistant Examiner* — Latresa A McCallum
(74) *Attorney, Agent, or Firm* — Studebaker & Brackett PC

(57) ABSTRACT

A radio terminal receives multicast data belonging to an MBMS service from a base station. The radio terminal includes a receiver configured to receive configuration information indicating one or more common resource pools shared by a plurality of radio terminals to transmit feedback information corresponding to the multicast data to the base station, the configuration information including information indicating a correspondence relationship between an attribute of the feedback information and a common resource pool and/or a signal sequence; a controller configured to select a specific common resource pool used for transmission of the feedback information and/or a specific signal sequence used for transmission of the feedback information, based on the attribute of the feedback information to be transmitted to the base station and the correspondence relationship; and a transmitter configured to transmit the feedback information to the base station using the specific common resource pool and/or the specific signal sequence.

7 Claims, 19 Drawing Sheets

(51) Int. Cl.
*H04W 4/06* (2009.01)
*H04W 56/00* (2009.01)
*H04W 72/00* (2009.01)
*H04W 72/04* (2009.01)

(52) U.S. Cl.
CPC ............ *H04L 5/0007* (2013.01); *H04W 4/06* (2013.01); *H04W 56/0045* (2013.01); *H04W 72/005* (2013.01); *H04W 72/042* (2013.01)

(58) Field of Classification Search
CPC ........... H04W 56/0045; H04W 72/005; H04W 72/042; H04W 76/40; H04W 28/16; H04W 72/00
See application file for complete search history.

(56) References Cited

U.S. PATENT DOCUMENTS

| | | | |
|---|---|---|---|
| 9,467,819 B2* | 10/2016 | Niu | ................ H04L 5/0055 |
| 2010/0226263 A1* | 9/2010 | Chun | ................ H04L 5/0057 |
| | | | 370/252 |
| 2015/0341156 A1 | 11/2015 | Yang et al. | |
| 2017/0325277 A1 | 11/2017 | Fujishiro et al. | |
| 2018/0019851 A1 | 1/2018 | Takeda et al. | |
| 2018/0115430 A1* | 4/2018 | Seo | ................ H04L 1/0026 |
| 2018/0332089 A1* | 11/2018 | Lohmar | ............. H04L 65/4076 |

FOREIGN PATENT DOCUMENTS

| | | |
|---|---|---|
| JP | 2016-510529 A | 4/2016 |
| WO | 2016/025638 A1 | 2/2016 |
| WO | 2016/121567 A1 | 8/2016 |
| WO | 2016/121916 A1 | 8/2016 |

\* cited by examiner

FIG. 9

```
SystemInformationBlockType20 information element

-- ASN1START

SystemInformationBlockType20-r13 ::=    SEQUENCE {
    sc-mcch-RepetionPeriod-r13          ENUMERATED {rf2, rf4, rf8, rf16, rf32, rf64, rf128, rf256},
    sc-mcch-Offset-r13                  INTEGER (0..10),
    sc-mcch-FirstSubframe-r13           INTEGER (0..9),
    sc-mcch-duration-r13                INTEGER (2..9)  OPTIONAL,
    sc-mcch-ModificationPeriod-r13      ENUMERATED {rf2, rf4, rf8, rf16, rf32, rf64, rf128, rf256,
                                        rf512, rf1024, r2048, rf4096, rf8192, rf16384, rf32768,
                                        rf65536},
    lateNonCriticalExtension            OCTET STRING                                    OPTIONAL,
    ...
}

-- ASN1STOP
```

FIG. 10

SCPTMConfiguration message

```
-- ASN1START

SCPTMConfiguration-r13 ::=      SEQUENCE {
    sc-mtch-InfoList-r13            SC-MTCH-InfoList-r13,
    scptm-NeighbourCellList-r13     SCPTM-NeighbourCellList-r13     OPTIONAL,   -- Need OP
    lateNonCriticalExtension        OCTET STRING                    OPTIONAL,
    nonCriticalExtension            SEQUENCE {}                     OPTIONAL
}

-- ASN1STOP
```

SC-MTCH-InfoList information element

```
-- ASN1START

SC-MTCH-InfoList-r13 ::=        SEQUENCE (SIZE (0..maxSC-MTCH-r13)) OF SC-MTCH-Info-r13

SC-MTCH-Info-r13 ::=            SEQUENCE   {
    mbmsSessionInfo-r13             MBMSSessionInfo-r13,
    g-RNTI-r13                      BIT STRING(SIZE(16)),
    sc-mtch-schedulingInfo-r13      SC-MTCH-SchedulingInfo-r13      OPTIONAL,   --
Need OP
    sc-mtch-neighbourCell-r13       BIT STRING (SIZE(maxNeighCell-SCPTM-r13))
    OPTIONAL,   -- Need OP
    ...
}

MBMSSessionInfo-r13 ::=         SEQUENCE   {
    tmgi-r13                        TMGI-r9,
    sessionId-r13                   OCTET STRING (SIZE (1))         OPTIONAL    -- Need OR
}

SC-MTCH-SchedulingInfo-r13::=   SEQUENCE   {
    onDurationTimerSCPTM-r13        ENUMERATED {
                                        psf1, psf2, psf3, psf4, psf5, psf6,
                                        psf8, psf10, psf20, psf30, psf40,
                                        psf50, psf60, psf80, psf100,
                                        psf200},
    drx-InactivityTimerSCPTM-r13    ENUMERATED {
                                        psf0, psf1, psf2, psf4, psf8,
                                        psf10, psf20, psf40,
                                        psf80, psf160, ps320,
                                        psf640, psf960,
                                        psf1280, psf1920, psf2560},
    schedulingPeriodStartOffsetSCPTM-r13    CHOICE {
        sf10                            INTEGER(0..9),
        sf20                            INTEGER(0..19),
        sf32                            INTEGER(0..31),
        sf40                            INTEGER(0..39),
        sf64                            INTEGER(0..63),
        sf80                            INTEGER(0..79),
        sf128                           INTEGER(0..127),
        sf160                           INTEGER(0..159),
        sf256                           INTEGER(0..255),
        sf320                           INTEGER(0..319),
        sf512                           INTEGER(0..511),
        sf640                           INTEGER(0..639),
        sf1024                          INTEGER(0..1023),
        sf2048                          INTEGER(0..2048),
        sf4096                          INTEGER(0..4096),
        sf8192                          INTEGER(0..8192)
    },
    ...
}

-- ASN1STOP
```

```
-- ASN1START

SCPTM-NeighbourCellList-r13 ::= SEQUENCE (SIZE (1..maxNeighCell-SCPTM-r13)) OF PCI-ARFCN-r1
                                                                                         3
PCI-ARFCN-r13 ::=               SEQUENCE {
    physCellId-r13                  PhysCellId,
    carrierFreq-r13                 ARFCN-ValueEUTRA-r9             OPTIONAL
}

-- ASN1STOP
```

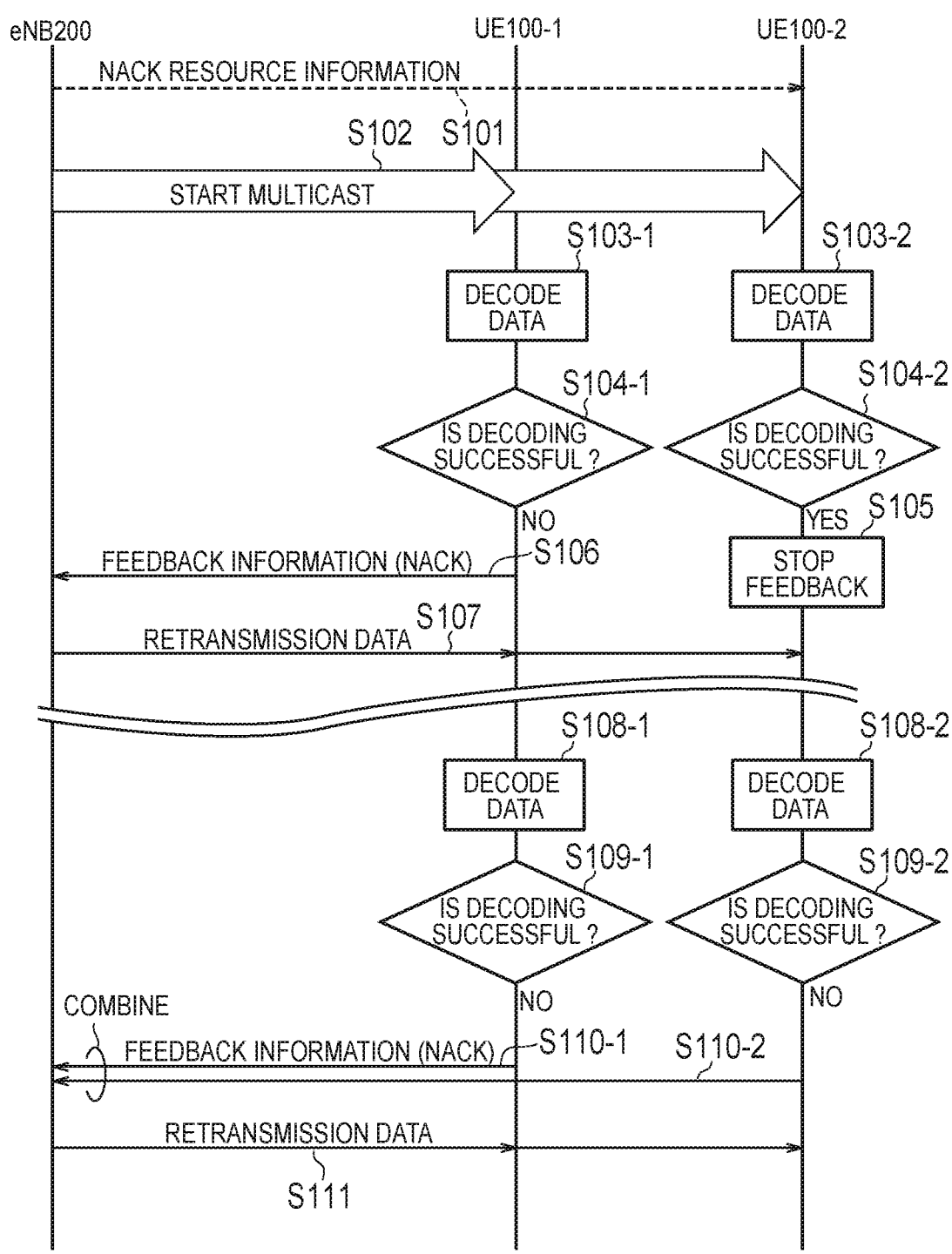

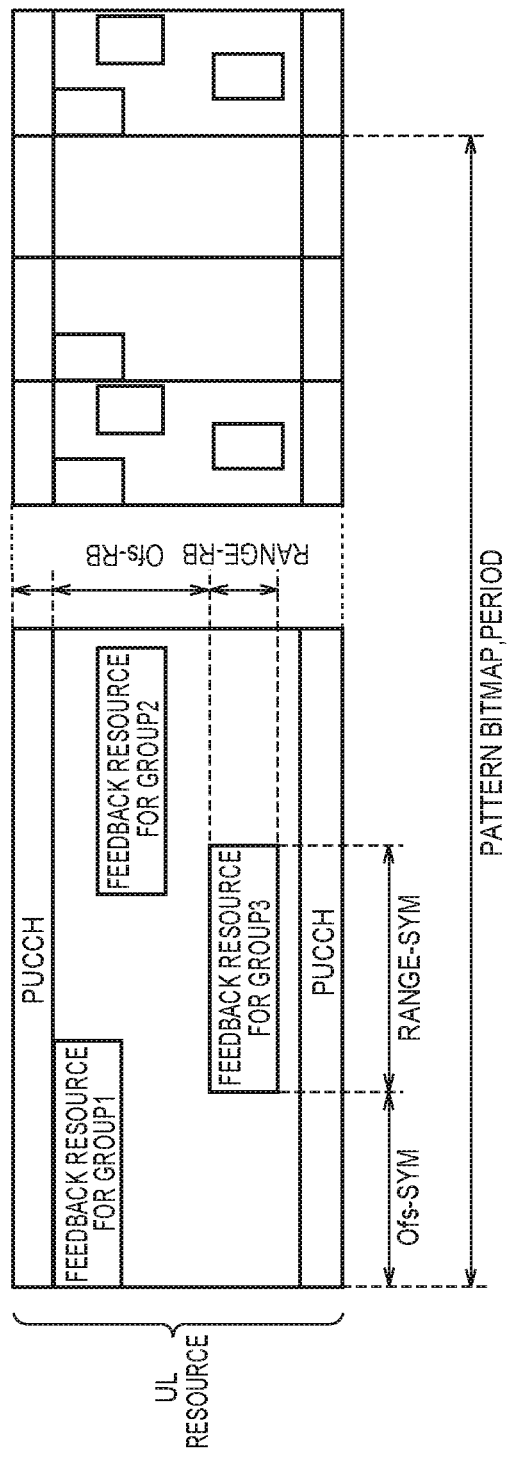

ENHANCING UTILIZATION EFFICIENCY OF RADIO RESOURCES IN MBMS

TECHNICAL FIELD

The present disclosure relates to a radio terminal and a base station for a mobile communication system.

BACKGROUND ART

In 3GPP (Third Generation Partnership Project), which is a project aiming to standardize a mobile communication system, the specifications of MBMS (Multimedia Broadcast Multicast Service) have been laid out to provide a radio terminal with a multicast/broadcast service. Radio transmission schemes for the MBMS include two schemes: MBSFN (Multicast Broadcast Single Frequency Network) transmission and SC-PTM (Single Cell Point-To-Multipoint) transmission. Since the MBMS uses the same radio resource to transmit the same data to a plurality of radio terminals, the utilization efficiency of radio resources can be enhanced.

SUMMARY OF THE INVENTION

A radio terminal according to one embodiment is configured to receive multicast data belonging to an MBMS service from a base station. The radio terminal comprises: a receiver configured to receive configuration information indicating one or more common resource pools shared by a plurality of radio terminals to transmit, to the base station, feedback information corresponding to the multicast data, the configuration information including information indicating a correspondence relationship between an attribute of the feedback information and a common resource pool and/or a signal sequence; a controller configured to select a specific common resource pool used for transmission of the feedback information and/or a specific signal sequence used for transmission of the feedback information, based on the attribute of the feedback information to be transmitted to the base station and the correspondence relationship; and a transmitter configured to transmit the feedback information to the base station by using the specific common resource pool and/or the specific signal sequence.

A base station according to one embodiment is configured to transmit multicast data belonging to an MBMS service. The base station comprises: a transmitter configured to transmit configuration information indicating one or more common resource pools shared by a plurality of radio terminals to transmit, to the base station, feedback information corresponding to the multicast data, the configuration information including information indicating a correspondence relationship between an attribute of the feedback information and a common resource pool and/or a signal sequence; a receiver configured to receive the feedback information transmitted from the radio terminal using a specific common resource pool and/or a specific signal sequence; and a controller configured to determine an attribute of the feedback information received from the radio terminal, based on the specific common resource pool and/or the specific signal sequence and the correspondence relationship.

BRIEF DESCRIPTION OF THE DRAWINGS

FIG. 9 is a diagram illustrating an SIB 20 according to the embodiment.

FIG. 10 is a diagram illustrating SCPTM configuration information (SCPTM Configuration) according to the embodiment.

FIG. 11 is a diagram illustrating an example of an operation sequence of NACK-only feedback according to the embodiment.

FIG. 12 is a diagram illustrating an example of a common resource pool according to the embodiment.

DESCRIPTION OF THE EMBODIMENT (Mobile Communication System)

Figure 1:
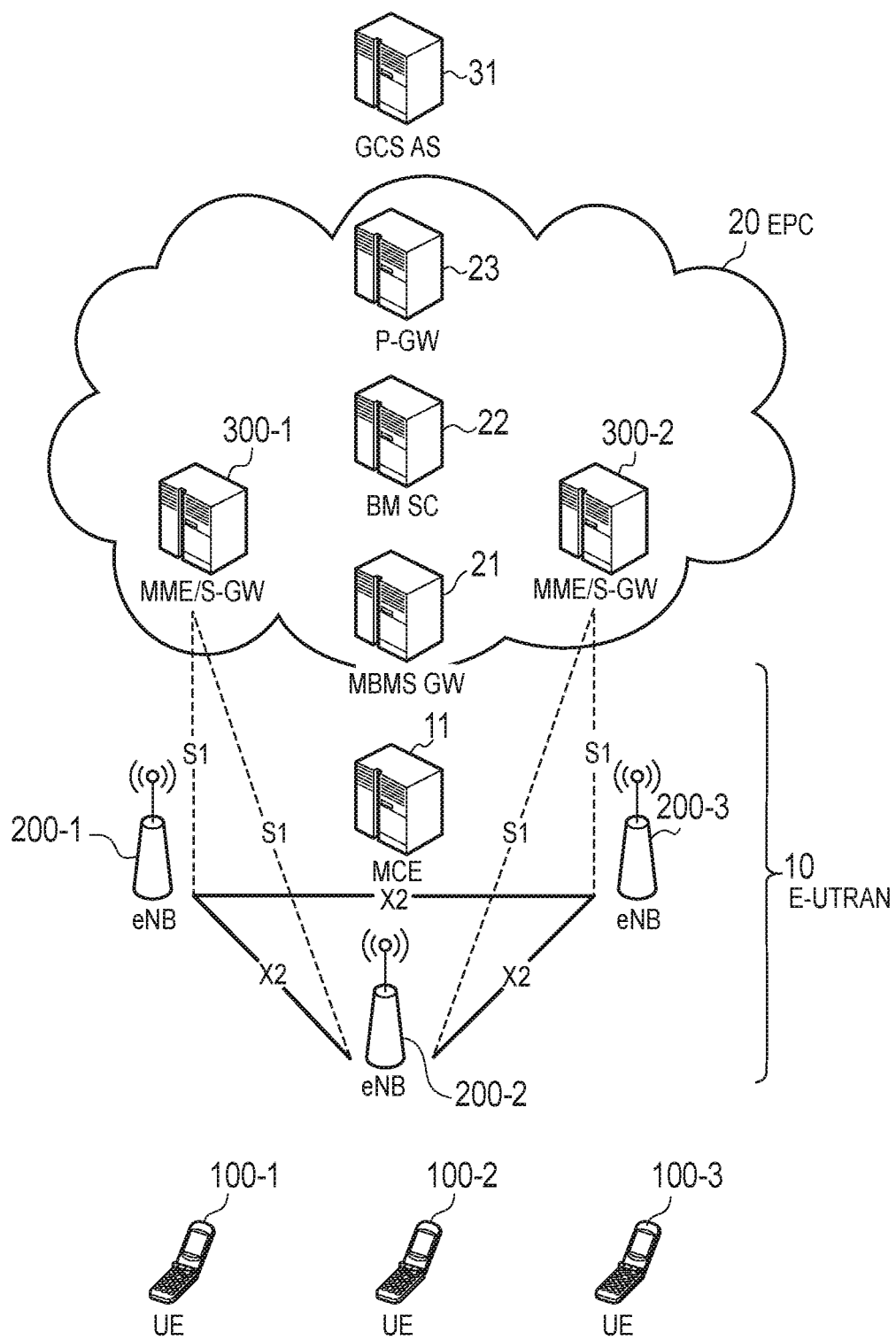
FIG. 1 is a diagram illustrating a configuration of an LTE system according to an embodiment.
Figure 2:
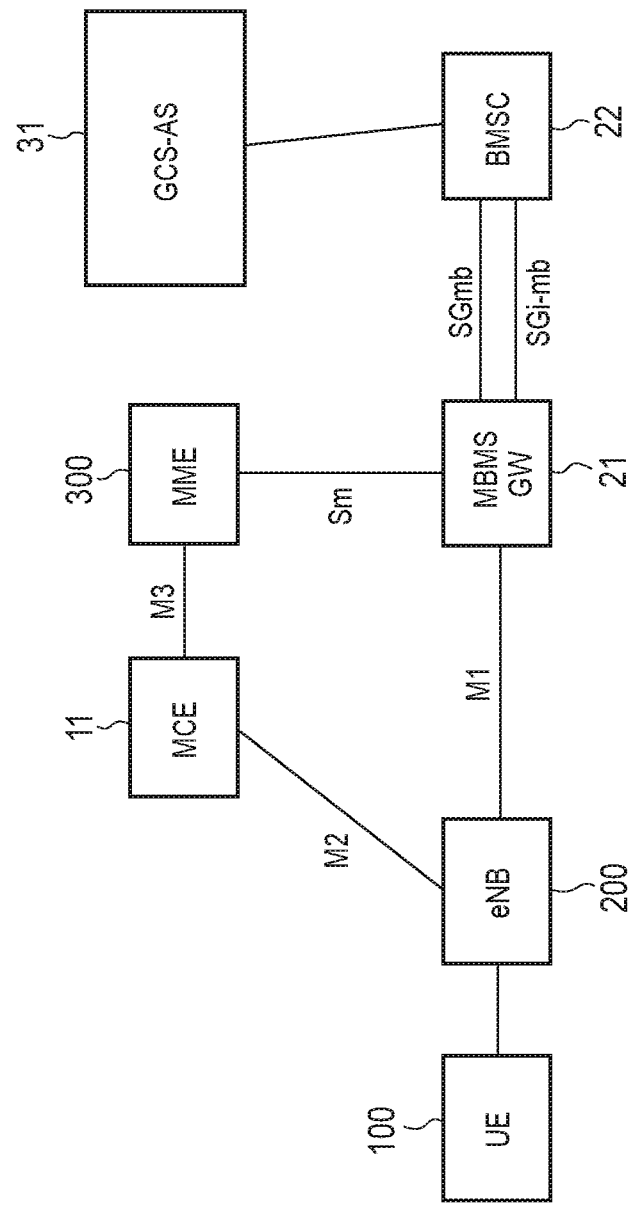
FIG. 2 is a diagram illustrating a network configuration for MBMS according to the embodiment.

The configuration of the mobile communication system according to the embodiment will be described. The mobile communication system according to the embodiment is an LTE (Long Term Evolution) system whose specifications are defined in 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 configure a network of the LTE system.

The UE 100 is a mobile communication device. The UE 100 performs radio communication with the eNB 200 that manages the cell (serving cell) in which the UE 100 exists.

The E-UTRAN 10 includes base stations (evolved Node-Bs) 200. The eNBs 200 are connected to each other via an X2 interface. The eNB 200 manages one or a plurality of cells and performs radio communication with the UE 100 that has established connection with a cell of the eNB 200. The eNB 200 has a radio resource management (RRM)

function, a routing function of user data (hereinafter referred to simply as "data"), a measurement control function for mobility control/scheduling, and the like. "Cell" is used as a term indicating the smallest unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW 300 is connected to the eNB 200 via an S1 interface.

Network entity for MBMS will be described. The E-UTRAN 10 includes an MCE (Multi-Cell/Multicast Coordinating Entity) 11. The MCE 11 is connected to the eNB 200 via an M2 interface. The MCE is connected to the MME 300 via an M3 interface (see FIG. 2). The MCE 11 performs MBSFN radio resource management/allocation and the like. Specifically, the MCE 11 performs scheduling of MBSFN transmission. On the other hand, the scheduling of the SC-PTM transmission is performed by the eNB 200.

The EPC 20 includes an MBMS GW (MBMS Gateway) 21. The MBMS GW 21 is connected to the eNB 200 via an M1 interface. The MBMS GW 21 is connected to the MME 300 via an Sm interface. The MBMS GW 21 is connected to the BM-SC 22 via an SG-mb and SGi-mb interfaces (see FIG. 2). The MBMS GW 21 performs IP multicast data transmission, session control and the like to the eNB 200.

The EPC 20 includes a BM-SC (Broadcast Multicast Service Center) 22. The BM-SC 22 is connected to the MBMS GW 21 via the SG-mb and SGi-mb interfaces. The BM-SC 22 is connected to the P-GW 23 via an SGi interface (see FIG. 2). The BM-SC 22 manages and allocates TMGI (Temporary Mobile Group Identity) and the like.

A GCS AS (Group Communication Service Application Server) 31 is provided in a network (that is, the Internet) outside the EPC 20. The GCS AS 31 is an application server for group communication. The GCS AS 31 is connected to the BM-SC 22 via an MB2-U interface and an MB2-C interface. The GCS AS 31 is connected to the P-GW 23 via the SGi interface. The GCS AS 31 performs management of groups and data distribution etc. in group communication.

Figure 3:
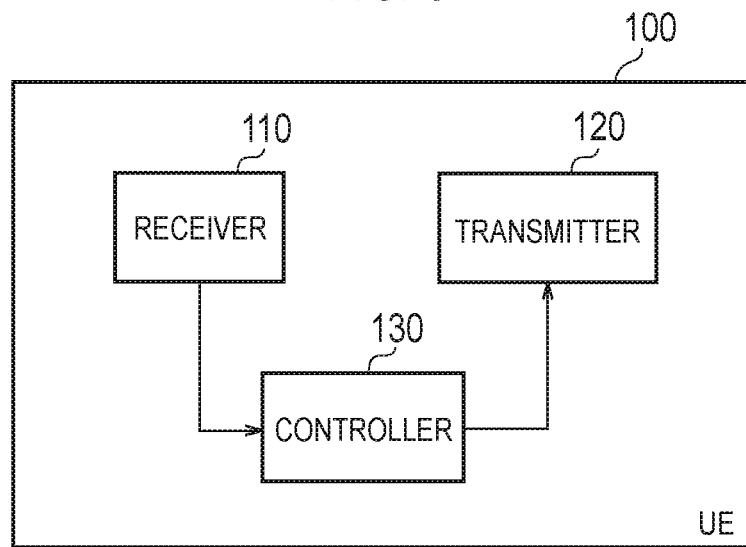
FIG. 3 is a diagram illustrating a configuration of a UE (radio terminal) according to the embodiment.

FIG. 3 is a diagram illustrating the configuration of the UE 100 (radio terminal) according to the embodiment. As illustrated in FIG. 3, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal). The receiving machine outputs the baseband signal to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal. The transmitting machine transmits the radio signal from the antennas.

The controller 130 performs various controls in the UE 100. The controller 130 includes a processor and a memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU executes various processe by executing programs stored in the memory. The processor may include a codec. The codec performs encoding/decoding audio/video signals. The processor executes various processes to be described later.

Figure 4:
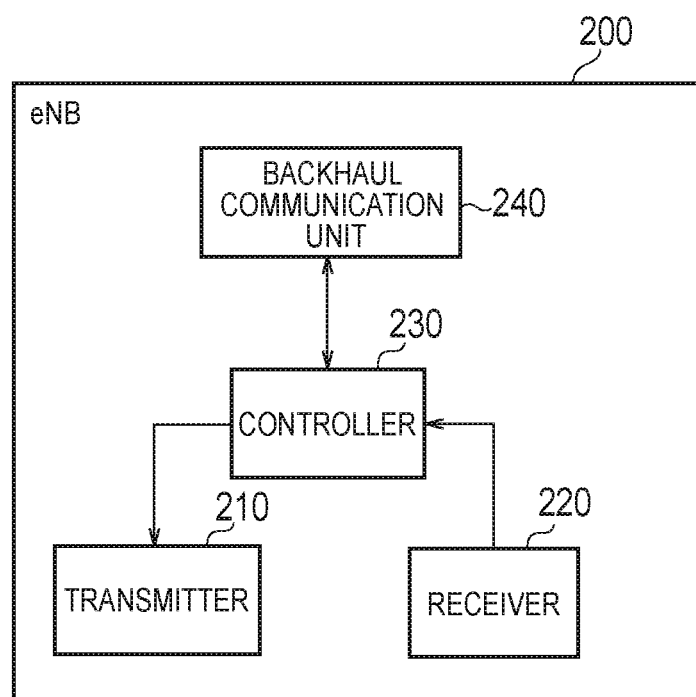
FIG. 4 is a diagram illustrating a configuration of an eNB (base station) according to the embodiment.

FIG. 4 is a diagram illustrating a configuration of an eNB (base station) according to the embodiment. As illustrated in FIG. 4, the eNB 200 includes a transmitter 210, a receiver 220, a controller 230, and a backhaul communication unit 240.

The transmitter 210 performs various transmissions under the control of the controller 230. The transmitting unit 210 includes antennas and a transmitting machine. The transmitting machine converts a baseband signal (transmission signal) outputted by the controller 230 into a radio signal. The transmitting machine transmits the radio signal from the antennas.

The receiver 220 performs various types of reception under the control of the controller 230. The receiver 220 includes antennas and a receiving machine. The receiving machine converts the radio signal received by the antennas into a baseband signal (received signal). The receiving machine outputs the baseband signal to the controller 230.

The controller 230 performs various controls in the eNB 200. The controller 230 includes a processor and a memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU executes various processes by executing programs stored in the memory. The processor executes various processes to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 5:
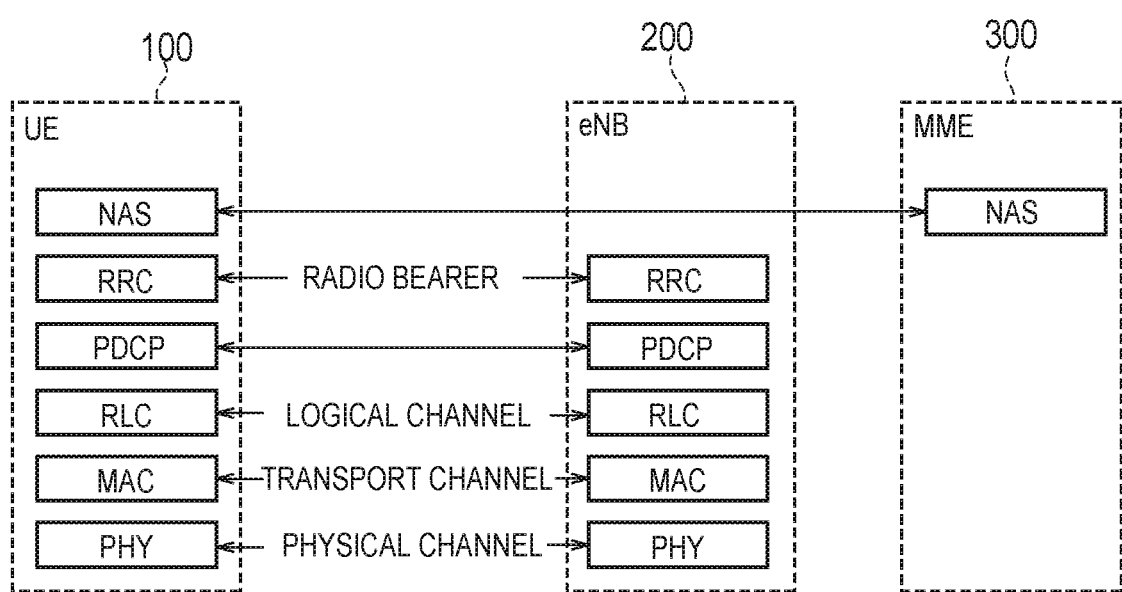
FIG. 5 is a diagram illustrating a protocol stack of a radio interface in the LTE system according to the embodiment.

FIG. 5 is a diagram illustrating a protocol stack of a radio interface in the LTE system. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by HARQ (Hybrid ARQ), and the like. Between the MAC layer of the UE 100 and the MAC layer of the eNB 200, data and control signals are transmitted via the transport channel. The MAC layer of the eNB 200 includes a scheduler. The scheduler determines the uplink and downlink transport format (Transport Block Size, Modulation and Coding Scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various settings are transmitted between the RRC layer of the UE 100 and the RRC layer of the eNB 200. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected mode, otherwise the UE 100 is in the RRC idle mode.

The NAS (Non-Access Stratum) layer located above the RRC layer performs session management, mobility management, and the like.

Figure 6A:
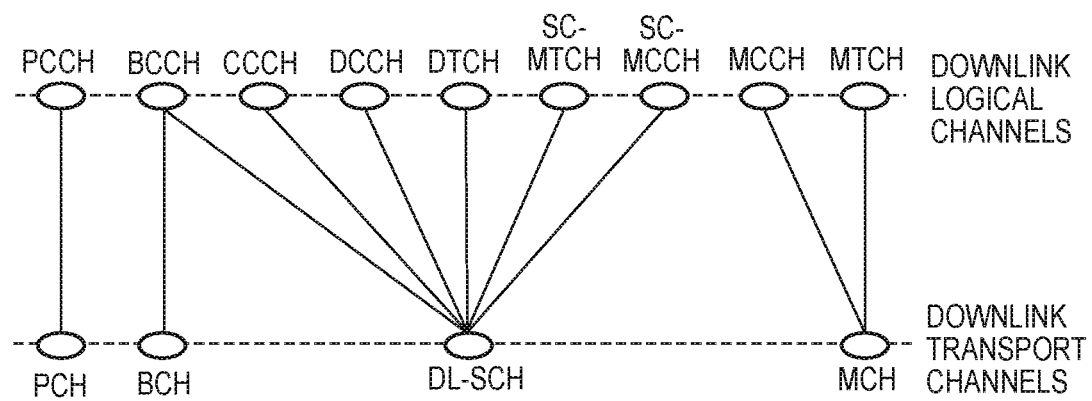
FIG. 6 is a diagram illustrating a channel configuration of downlink of the LTE system according to the embodiment.
Figure 6B:
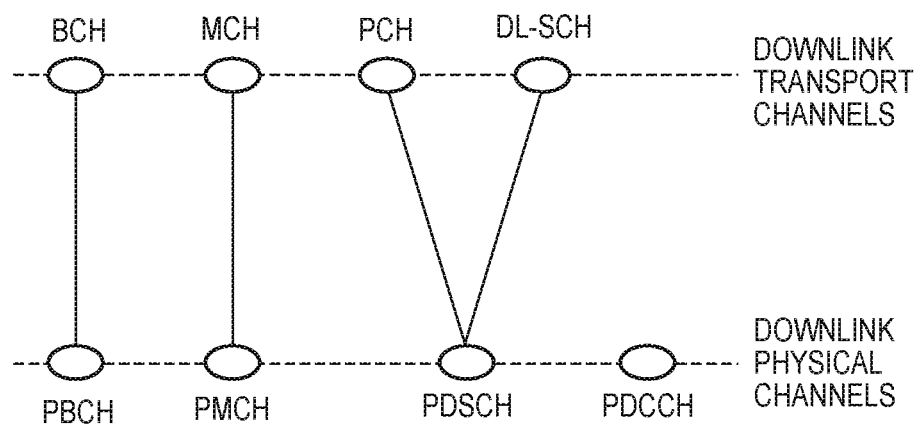

FIG. 6 is a diagram illustrating a channel configuration of downlink of the LTE system. FIG. 6(*a*) illustrates mapping between a logical channel (Downlink Logical Channel) and a transport channel (Downlink Transport Channel).

As illustrated in FIG. 6(*a*), PCCH (Paging Control Channel) is a logical channel for notifying paging information and system information change. The PCCH is mapped to PCH (Paging Channel) that is a transport channel.

BCCH (Broadcast Control Channel) is a logical channel for system information. The BCCH is mapped to BCH (Broadcast Control Channel) and a DL-SCH (Downlink Shared Channel), both of which are transport channels.

CCCH (Common Control Channel) is a logical channel for transmission control information between the UE 100 and the eNB 200. The CCCH is used if the UE 100 does not have an RRC connection with the network. The CCCH is mapped to the DL-SCH.

DCCH (Dedicated Control Channel) is a logical channel for transmitting individual control information between the UE 100 and the network. The DCCH is used if the UE 100 has an RRC connection. The DCCH is mapped to the DL-SCH.

DTCH (Dedicated Traffic Channel) is an individual logical channel for data transmission. The DTCH is mapped to the DL-SCH.

SC-MTCH (Single Cell Multicast Traffic Channel) is a logical channel for SC-PTM transmission. The SC-MTCH is a point-to-multipoint downlink channel for transmitting data from the network to the UE 100 by using the SC-PTM transmission.

SC-MCCH (Single Cell Multicast Control Channel) is a logical channel for SC-PTM transmission. The SC-MCCH is a point-to-multipoint downlink channel for transmitting MBMS control information for one or more SC-MTCHs from the network to the UE 100. The SC-MCCH is used for a UE 100 that is to receive an MBMS using SC-PTM or that is interested in the reception. Further, there is only one SC-MCCH in one cell.

MCCH (Multicast Control Channel) is a logical channel for MBSFN transmission. The MCCH is used for transmitting MBMS control information for MTCH from the network to the UE 100. The MCCH is mapped to an MCH (Multicast Channel) that is a transport channel.

MTCH (Multicast Traffic Channel) is a logical channel for MBSFN transmission. The MTCH is mapped to the MCH.

FIG. 6(*b*) illustrates mapping between a transport channel (Downlink Transport Channel) and a physical channel (Downlink Physical Channel).

As illustrated in FIG. 6(*b*), the BCH is mapped to PBCH (Physical Broadcast Channel).

The MCH is mapped to PMCH (Physical Multicast Channel). The MCH supports MBSFN transmission by a plurality of cells.

The PCH and the DL-SCH are mapped to PDSCH (Physical Downlink Shared Channel). The DL-SCH supports HARQ, link adaptation, and dynamic resource allocation.

PDCCH carries resource allocation information of the PDSCH (DL-SCH, PCH), HARQ information on the DL-SCH, and the like. Further, the PDCCH carries an uplink scheduling grant.

Figure 7:
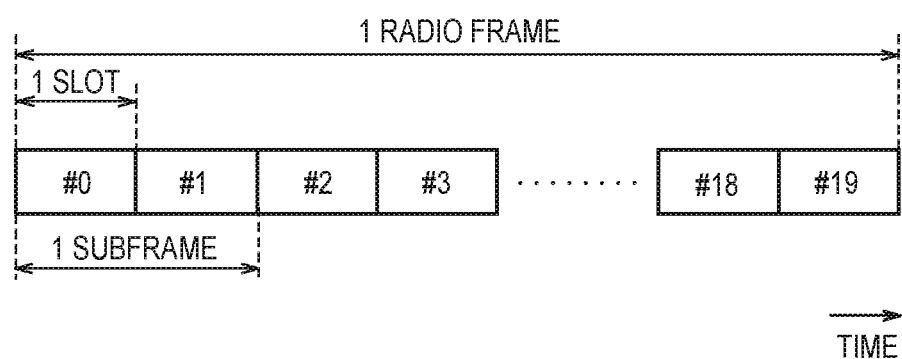
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 7, the radio frame includes ten subframes arranged in a time direction. Each of the subframes includes two slots arranged in the time direction. Each of the subframes has a length of 1 ms and each of the slots has a length of 0.5 ms. Each of the subframes includes a plurality of resource blocks (RBs) in a frequency direction, and a plurality of symbols in the time direction. Each of the resource blocks includes a plurality of subcarriers in the frequency direction. One resource element (RE) includes one symbol and one subcarrier. Further, of radio resources (time and frequency resources) to be allocated to a UE 100, the frequency resource can be identified by a resource block, and the time resource can be identified by a subframe (or a slot).

In the downlink, a section including several symbols at the head of each of the subframes is a region used as the PDCCH for mainly transmitting a downlink control signal. Furthermore, the remaining portion of each of the subframes is a region available as the PDSCH for mainly transmitting downlink data. Further, in the downlink, an MBSFN subframe that is a subframe for MBSFN transmission may be set.

In the uplink, both ends in the frequency direction of each subframe are regions used as the PUCCH for mainly transmitting a uplink control signal. The remaining portion of each subframe is a region available as the PUSCH for mainly transmitting uplink data.

(Outline of SC-PTM)

Radio transmission schemes for MBMS include two schemes: MBSFN transmission and SC-PTM transmission. In the MBSFN transmission, data is transmitted via the PMCH for each MBSFN area including a plurality of cells. In contrast, in the SC-PTM transmission, data is transmitted via the PDSCH for each cell. In the following, a scenario in which the UE 100 performs SC-PTM reception is mainly assumed. However, MBSFN may be assumed.

The UE 100 may receive an MBMS service in the RRC connected mode. The UE 100 may receive an MBMS service in the RRC idle mode. In the following, a case where the UE 100 receives an MBMS service in the RRC idle mode is mainly assumed.

Figure 8:
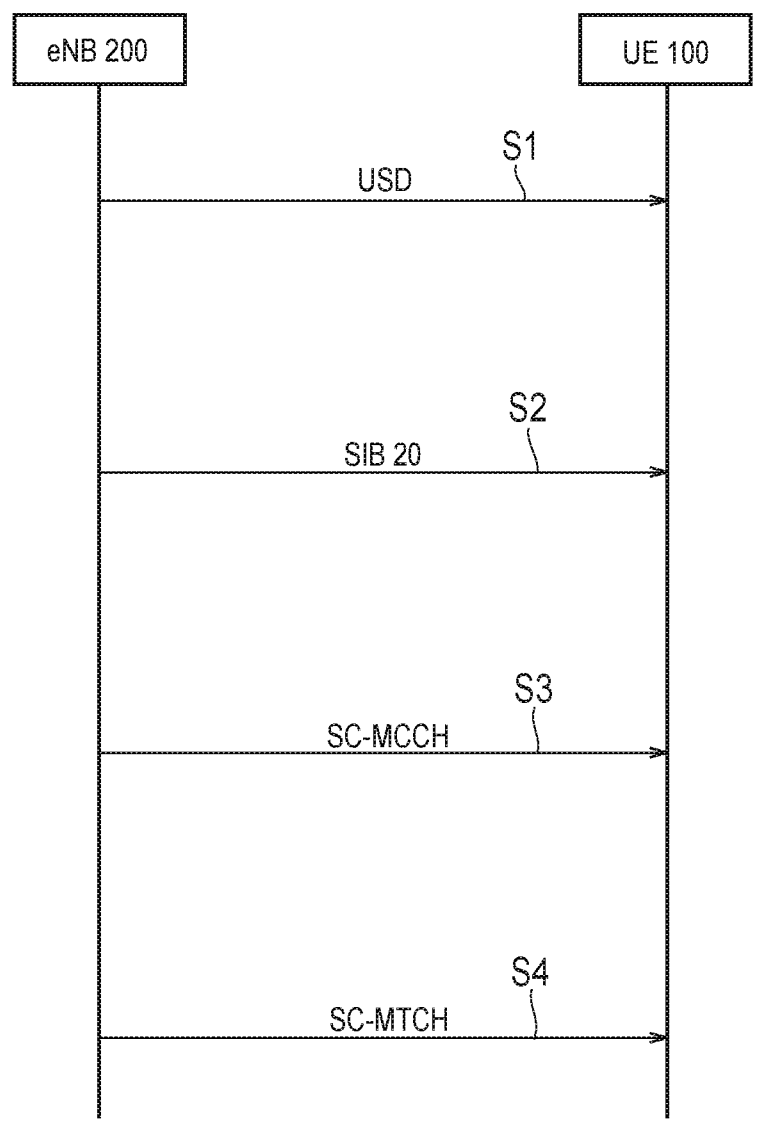
FIG. 8 is a diagram illustrating an example of an operation of SC-PTM according to the embodiment.

FIG. 8 is a diagram illustrating an example of an operation of SC-PTM.

As illustrated in FIG. 8, in step S1, the UE 100 acquires a USD (User Service Description) from the EPC 20 via the eNB 200. The USD provides basic information on each MBMS service. For each MBMS service, the USD includes a TMGI for identifying the MBMS service, a frequency at which the MBMS service is provided, and a provision start/end time of the MBMS service.

In step S2, the UE 100 receives an SIB 20 from the eNB 200 via the BCCH. The SIB 20 includes information (scheduling information) necessary for acquiring the SC-MCCH. FIG. 9 is a diagram illustrating the SIB 20. As illustrated in FIG. 9, the SIB 20 includes sc-mcch-ModificationPeriod representing a cycle in which the content of the SC-MCCH can be changed, sc-mcch-RepetitionPeriod representing a transmission (retransmission) time interval of the SC-MCCH in the number of radio frames, sc-mcch-Offset representing a scheduled radio frame offset of the SC-MCCH, sc-mcch-Subframe representing a subframe in which the SC-MCCH is scheduled, and so forth.

In step S3, the UE 100 receives SCPTM configuration information (SCPTM Configuration) from the eNB 200 via the SC-MCCH, based on the SIB 20. For the SC-MCCH transmission in the physical layer, an SC-RNTI (Single Cell RNTI) is used. FIG. 10 is a diagram illustrating the SCPTM configuration information (SCPTM Configuration) in the SC-MCCH. As illustrated in FIG. 10, the SCPTM configuration information includes control information applicable to the MBMS service, which is transmitted via SC-MRB (Single Cell MBMS Point to Multipoint Radio Bearer). The SCPTM configuration information includes sc-mtch-Info-List containing setting for each SC-MTCH in the cell transmitting that information, and scptmNeighbourCellList being a list of neighbour cells providing the MBMS service via the SC-MRB. The sc-mtch-InfoList contains one or more pieces of SC-MTCH-Info. Each piece of the SC-MTCH-Info contains information on an ongoing MBMS session (mbmsSessionInfo) to be transmitted via the SC-MRB, a G-RNTI (Group RNTI) corresponding to the MBMS session, and sc-mtch-schedulingInfo being DRX information for the SC-MTCH. The mbmsSessionInfo contains a TMGI and a session ID (sessionId) to identify the MBMS service. The G-RNTI is an RNTI to identify a multicast group (specifically, SC-MTCH addressed to a specific group). The G-RNTI is mapped to the TMGI on a one-to-one basis. The sc-mtch-schedulingInfo contains onDurationTimerSCPTM, drx-InactivityTimerSCPTM, and schedulingPeriodStartOffsetSCPTM. The schedulingPeriodStartOffsetSCPTM contains SC-MTCH-SchedulingCycle and SC-MTCH-SchedulingOffset.

In step S4, the UE 100 receives the MBMS service (multicast data) corresponding to the TMGI, in which the UE 100 itself is interested, via the SC-MTCH, based on SC-MTCH-SchedulingInfo in the SCPTM configuration information (SCPTM Configuration). In the physical layer, the eNB 200, after transmitting the PDCCH by using the G-RNTI, transmits the multicast data via the PDSCH.

(Basic Operation of NACK-Only HARQ Feedback)

In the embodiment, a feedback is introduced to the SC-PTM. In the following, a case where feedback information is delivery acknowledgment information (ACK/NACK) is mainly assumed. Further, a case where the UE 100 configured to perform SC-PTM reception is in an RRC idle mode is mainly assumed.

If the downlink unicast transmission is applied, the transmitter 120 of the UE 100 transmits, as feedback information, either an acknowledgement (ACK) indicating that the downlink data is successfully received or a negative acknowledgement (NACK) indicating that reception of the downlink data is failed, to the eNB 200. That is, if the reception of the downlink data is failed, the NACK is transmitted, and if the downlink data is successfully received, the ACK is transmitted. The ACK is HARQ ACK. The NACK is HARQ NACK.

On the other hand, when the SC-PTM is applied, the controller 130 stops the transmission of the ACK so that only the NACK, out of the ACK and the NACK, is transmitted as the feedback information to the eNB 200. That is, if the reception of the downlink data (multicast data) is failed, the NACK is transmitted, but the ACK is not transmitted even if the downlink data (multicast data) is successfully received. In this way, when only the NACK is used as delivery acknowledgment information for the SC-PTM, it is possible to save the uplink radio resource (for example, the PUCCH resource) associated with transmission of ACK.

Further, if the SC-PTM is applied, the transmitter 120 of the UE 100 uses a radio resource (for example, resource element, etc.) common to a UE group (multicast group) including a plurality of UEs 100 and a signal sequence (for example, base sequence, etc.) common thereto to transmit the NACK. Specifically, such a common resource pool is allocated to each UE group from the eNB 200, and the UE 100 transmits the NACK by using the common resource pool of the UE group to which the UE 100 belongs. The UE group is identified by a TMGI and/or a G-RNTI. Such a common resource pool allocation may be designated through broadcasting by system information (SIB: System Information Block), or may be designated by the DCI at the time of SC-PTM allocation in the PDCCH.

In this way, using the common resource pool makes it unnecessary to allocate a resource for each UE 100, so that even if the UE 100 is in the RRC idle mode, it is possible to transmit the feedback information to the eNB 200. It is also possible to save the uplink radio resource (for example, the PUCCH resource) associated with the transmission of the NACK.

It is noted that when the NACK using such a common resource pool is applied, the NACKs of the plurality of UEs 100 are combined. As a result, the eNB 200 cannot identify a UE from which the NACK is transmitted. However, when retransmission is performed by multicast to each UE 100 in the group, it is not necessary to identify from which UE 100 the NACK is transmitted.

Next, an operation of the eNB 200 will be described. If the downlink unicast transmission is applied, the receiver 220 of the eNB 200 receives, as feedback information, either the ACK indicating that the downlink data is successfully received or the NACK indicating that reception of the downlink data is failed, from the UE 100. On the other hand, if the SC-PTM is applied, the receiver 220 of the eNB 200 receives only the NACK, out of the ACK and the NACK, from the UE 100, as the feedback information. If the SC-PTM is applied, the controller 230 of the eNB 200 allocates a common radio resource and a common signal sequence for transmitting the NACK, to the UE group. Specifically, such a common resource pool is allocated to each UE group.

Next, an example of an operation sequence will be described. FIG. 11 is a diagram illustrating an example of an operation sequence of NACK-only feedback.

As illustrated in FIG. 11, in step S101, the eNB 200 transmits configuration information on the common resource pool for transmitting the NACK to the UE 100 (a UE 100-1, a UE 100-2) in the group. The configuration information on the common resource pool for transmitting the NACK may be transmitted by broadcast from the eNB 200 by the system information (SIB). The configuration information may be transmitted by unicast from the eNB 200 by using an individual RRC message. Each UE 100 receives the configuration information to be stored.

In step S102, the eNB 200 starts multicast transmission by the SC-PTM.

In step S103, the UE 100 (the UE 100-1, the UE 100-2) attempts to decode the received multicast data.

In step S104, the UE 100 (the UE 100-1, the UE 100-2) confirms whether or not the decoding of the multicast data is successful. Here, it is assumed that the UE 100-1 fails to decode and the UE 100-2 successfully decodes.

In step S105, the UE 100-2 stops transmitting the feedback information (NACK) to the eNB 200.

On the other hand, in step S106, the UE 100-1 transmits the NACK to the eNB 200 by using the common resource pool for transmitting the NACK.

In step S107, the eNB 200 transmits retransmission data to the UE 100 (the UE 100-1, the UE 100-2) in the group in response to receiving the NACK. The UE 100-2 that has successfully received in S104-2 does not have to receive the retransmission data. Whether or not the data is retransmission data can be determined by whether or not an NDI (New Data Indicator) in the PDCCH corresponding to the PDSCH carrying the data is toggled. Specifically, the UE 100-2 determines that it is retransmission data if the NDI (in PDCCH) when the data (PDSCH) is decoded in S103-2 indicates the same value as that of the NDI when the retransmission data is transmitted in S107; if they indicate different values, it is determined that it is not retransmission data.

Thereafter, in step S108, the UE 100 (the UE 100-1, the UE 100-2) confirms whether or not the decoding of the newly received multicast data is successful. Here, it is assumed that both the UE 100-1 and the UE 100-2 fail to decode (S109; NO).

In step S110, the UE 100-1 and the UE 100-2 transmit the NACK to the eNB 200 by using a common resource pool for transmitting the NACK. These NACKs are received by the eNB 200 in a combined state.

In step S111, the eNB 200 transmits the retransmission data to the UE 100 (the UE 100-1, the UE 100-2) in the group in response to receiving the NACK.

In this way, when only the NACK is used as delivery acknowledgment information for the SC-PTM, it is possible to save the uplink radio resource (for example, the PUCCH resource) associated with transmission of ACK. Further, the UE 100 uses the common resource pool for each UE group to transmit the NACK, and thus it is possible to save an uplink radio resource to be used along with the transmission of the NACK.

Thus, according to the NACK-only HARQ feedback, from among the UEs 100 having received the multicast data, the UEs 100 that failed to receive feed back the NACK information to the eNB 200 with the same resource and the same signal sequence, so that the eNB 200 can perform the reception in a similar manner to a multipath combining. In addition, it is unnecessary to set a resource and signal sequence for each UE, so that even a UE 100 in an RRC idle mode can perform the feedback transmission.

Next, the common resource pool will be described. The receiver 110 of the UE 100 uses the same downlink radio resource to receive the multicast data to be transmitted to the plurality of UEs 100 from the eNB 200. The controller 130 selects a feedback resource from the common resource pool. The common resource pool is a resource pool allocated, by the eNB 200, to a group (UE group) including a plurality of UEs 100. The feedback resource is an uplink radio resource used for transmission of feedback information. The transmitter 120 uses the selected feedback resource to transmit the feedback information to the eNB 200.

FIG. 12 is a diagram illustrating an example of the common resource pool. As illustrated in FIG. 12, the common resource pool is a part of all the uplink radio resources. The common resource pool is composed of uplink radio resources different from the physical uplink control channels (PUCCH) individually allocated to each UE 100 by the eNB 200. That is, the common resource pool is provided inside both ends of the uplink frequency band.

The common resource pool is also allocated for each UE group. For example, a common resource pool is associated with a group identifier (TMGI, G-RNTI). In the example of FIG. 12, three common resource pools corresponding to three UE groups (group 1 to group 3) are provided in a predetermined time resource (one subframe or one radio resource). In this way, allocating the common resource pool for each UE group makes it possible to reduce the signaling (transmission of scheduling information) associated with allocation as compared with the case where the eNB 200 allocates the feedback resource every time. In addition, it is guaranteed that UEs 100 in the UE group transmit the feedback information in the common resource pool, the feedback control is not complicated, and the tightness of the uplink radio resources can be avoided.

The receiver 110 of the UE 100 receives the configuration information on the common resource pool from the eNB 200. As illustrated in FIG. 12, the configuration information on the common resource pool (group 3) includes at least one of a difference (Ofs-sym) between the reference point (0-th symbol) on the time axis and the start point of the common resource pool, a difference (Ofs-RB) between the reference point (0-th RB or PUCCH resource end) on the frequency axis and the start point of the common resource pool, a common resource pool range (Range-sym) on the time axis, and a common resource pool range (Range-RB) on the frequency axis. Here, parameters (Ofs-sym, Range-sym) on the time axis are expressed for each symbol, for each slot, for each subframe, or for each radio frame. Parameters (Ofs-RB, Range-RB) on the frequency axis are expressed for each subcarrier or for each resource block (RB). These parameters may also be defined for each frequency band. Alternatively, these parameters may be defined for each subband being a frequency basis including a predetermined number of RBs. Further, the configuration information on the common resource pool may include "ON/OFF pattern" and "cycle". The ON/OFF pattern is a parameter for expressing the presence or absence of a certain feedback resource for each subframe or slot. The cycle is a parameter for expressing a cycle of the ON/OFF pattern.

For a reception signal (received four subframes before) corresponding to a timing (OFF timing) at which no feedback resource exists, generation and transmission of feedback information can be omitted. In addition, the feedback information on the reception signal corresponding to the timing (OFF timing) at which no feedback resource exists may be transmitted collectively at a timing (ON timing) at which the feedback resource exists next time. For example, when in both subframes n and n+1, reception is successful, an ACK is transmitted; when in one or more of the subframes, reception is not successful, a NACK is transmitted (fed back), to the eNB 200 at a timing of the fourth subframe after subframe (n+1).

The controller 130 of the UE 100 may select from the common resource pool an uplink radio resource (feedback resource) to be used for transmission of the feedback information, based on unique information assigned to the UE 100 itself by the eNB 200 or unique information preset in the UE 100 itself. By performing such resource selection based on the unique information, it is possible to avoid collision of resources for feedback among UEs within the feedback resource.

Here, the unique information assigned to the UE 100 by the eNB 200 is, for example, a cell RNTI (C-RNTI). The unique information preset in the UE 100 itself is, for example, an IMSI (International Mobile Subscriber Identity) or an S-TMSI (SAE Temporary Mobile Subscriber Identity). The IMSI is unique information stored in a UIM card. The S-TMSI is unique information assigned to the UE 100 by the MME when the UE 100 performs location registration on the network. For example, the controller 130 of the UE 100 selects a frequency resource (RB) based on a part of unique information, and selects a time resource and a signal sequence (sequence) based on the remaining part of the unique information. Alternatively, the feedback resource may be selected by a calculation formula such as "the unique information mod the number of REs in the feedback resource pool".

The controller 230 of the eNB 200 allocates a common resource pool available for transmission of feedback information to a group including a plurality of UEs 100. The transmitter 210 of the eNB 200 transmits multicast data to the plurality of UEs 100 by using the same downlink radio resource. The receiver 220 of the eNB 200 receives from the plurality of UEs 100 feedback information transmitted by using the uplink radio resource selected from the common resource pool. As described above, the common resource pool includes uplink radio resources different from the physical uplink control channel (PUCCH) individually allocated to each UE 100 by the eNB 200 itself.

The transmitter 210 of the eNB 200 transmits the configuration information on the common resource pool to the plurality of UEs 100. As described above, the configuration information includes at least one of: the difference between the reference point on the time axis and the start point of the common resource pool, the difference between the reference point on the frequency axis and the start point of the common resource pool, the resource pool range on the time axis, and the common resource pool range on the frequency axis. The configuration information may include "ON/OFF pattern" and "cycle". The configuration information on the common resource pool may be transmitted by broadcast from the eNB 200 by the system information (SIB). The configuration information may be transmitted by unicast from the eNB 200 by using an individual RRC message. The configuration information may be transmitted through the DCI with CRC scrambled by the group RNTI.

Figure 13:
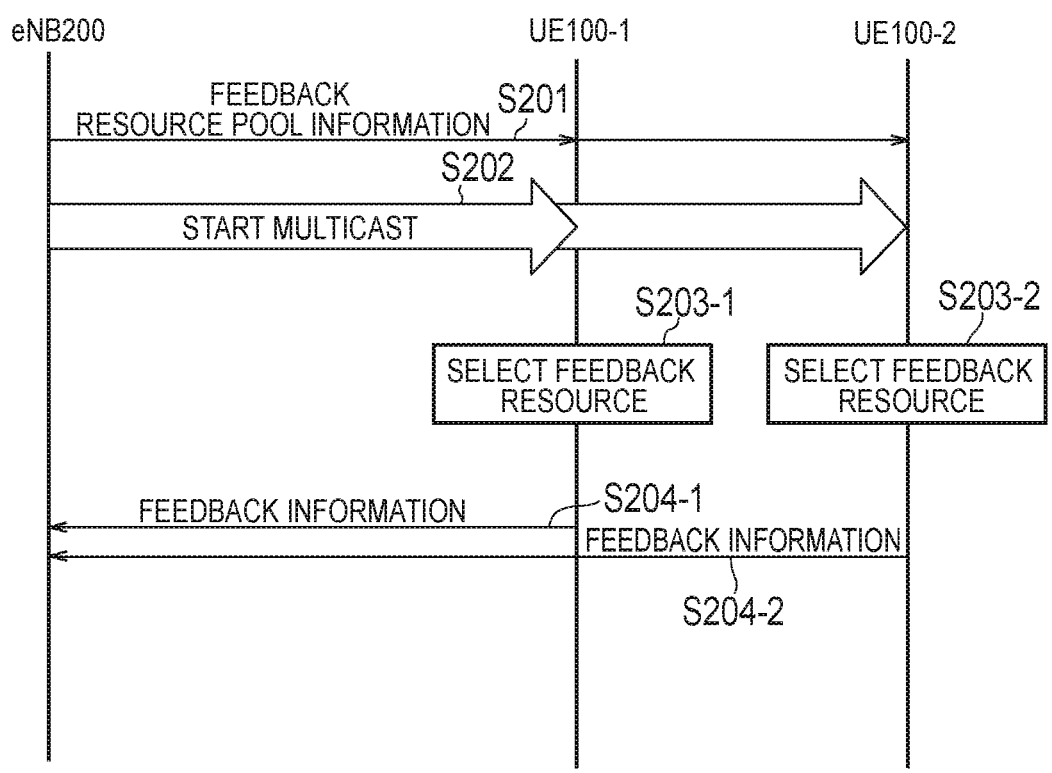
FIG. 13 is a diagram illustrating an example of an operation sequence relating to a common resource pool according to the embodiment.

FIG. 13 is a diagram illustrating an example of an operation sequence relating to a common resource pool.

As illustrated in FIG. 13, in step S201, the eNB 200 transmits configuration information on a common resource pool (common resource pool information) to UEs 100 (the UE 100-1, the UE 100-2) in the group. Each of the UEs 100 receives and stores the common resource pool information.

In step S202, the eNB 200 starts multicast transmission by the SCPTM.

In step S203, the UE 100 (the UE 100-1, the UE 100-2) selects a feedback resource from the common resource pool allocated to the own group based on the unique information of the UE itself.

In step S204, the UE 100 (the UE 100-1, the UE 100-2) transmits feedback information to the eNB 200 by using the selected feedback resource.

(Example According to NACK-Only HARQ Feedback)

An example according to NACK-only HARQ feedback will be described below. Examples 1 to 7 described below may be performed individually, or may be performed in combination of two or more examples.

(1) Example 1

In Example 1, the receiver 110 of the UE 100 receives multicast data belonging to an MBMS service from the eNB 200. The receiver 110 of the UE 100 receives from the eNB 200 configuration information indicating one or more common resource pools shared by a plurality of UEs 100 to transmit feedback information corresponding to the multicast data to the eNB 200. The configuration information includes information indicating a correspondence relationship between the attribute of the feedback information and the common resource pool.

The feedback information includes NACK indicating that reception of multicast data has failed. The attribute of the feedback information may be the identification information (TMGI) of the MBMS service to which the multicast data belongs.

The controller 130 of the UE 100 selects a specific common resource pool to be used for transmission of the feedback information based on the attribute of the feedback information to be transmitted to the eNB 200. The transmitter 120 of the UE 100 transmits the feedback information to the eNB 200 by using the specific common resource pool.

The transmitter 210 of the eNB 200 transmits the multicast data belonging to the MBMS service. The transmitter 210 of the eNB 200 transmits to the UE 100 the configuration information indicating one or more common resource pools shared by the plurality of UEs 100 to transmit the feedback information corresponding to the multicast data to the eNB 200. The receiver 220 of the eNB 200 receives the feedback information transmitted from the UE 100 by using the specific common resource pool. The controller 230 of the eNB 200 determines the attribute of the feedback information received from the UE 100 based on the specific common resource pool.

Figure 14:
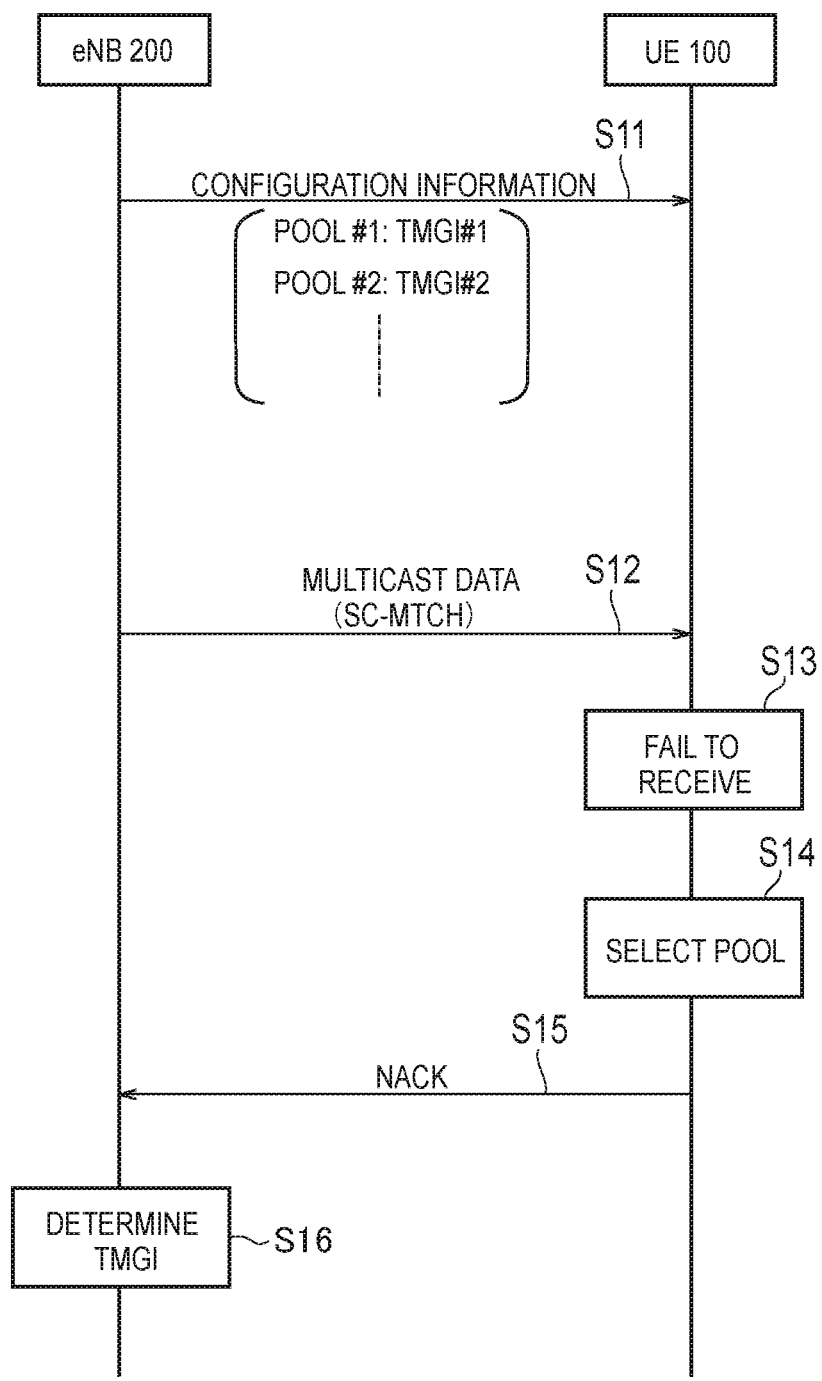
FIG. 14 is a diagram illustrating an operation sequence according to Example 1.

FIG. 14 is a diagram illustrating an operation sequence according to Example 1. In the initial state of FIG. 14, the UE 100 is in the RRC idle mode and is interested in receiving the MBMS service of TMGI #1.

As illustrated in FIG. 14, in step S11, the eNB 200 transmits configuration information indicating a plurality of common resource pools to the UE 100 by broadcast signaling or multicast signaling. The broadcast signaling may be SIB 20. The multicast signaling may be SC-MCCH. The UE 100 receives from the eNB 200 the configuration information to be stored.

The configuration information includes information (mapping information) indicating a correspondence relationship between a common resource pool and a TMGI. The TMGI includes a service identifier for identifying an MBMS service. As one example, common resource pool #1 and TMGI #1 are associated with each other, and common resource pool #2 and TMGI #2 are associated with each other.

In step S12, the eNB 200 transmits multicast data of TMGI #1 via the SC-MTCH. The UE 100 receives the multicast data of TMGI #1 from the eNB 200.

In step S13, the UE 100 detects a decoding error of the multicast data of TMGI #1 and determines that the reception of the multicast data of TMGI #1 has been failed.

In step S14, the UE 100 selects common resource pool #1 corresponding to TMGI #1 based on the configuration information. The UE 100 may further select a radio resource included in common resource pool #1.

In step S15, the UE 100 transmits a NACK to the eNB 200 by using the radio resource included in common resource pool #1. The eNB 200 receives the NACK from the UE 100.

In step S16, the eNB 200 determines that the NACK received in common resource pool #1 is a NACK for the corresponding TMGI #1. Based on the NACK, the eNB 200 may perform retransmission of the multicast data of TMGI #1 and/or adjustment of the MCS or the like (that is, link adaptation).

In Example 1, the mapping information in the configuration information may be information indicating a correspondence relationship between a common resource pool, a TMGI, and ACK/NACK. In addition to the common resource pool for NACK, a common resource pool for ACK is allocated. In this case, the attribute of the feedback information may include ACK/NACK in addition to the TMGI. As one example, common resource pool #1, TMGI #1, and NACK are associated with each other, and common resource pool #3, TMGI #1, and ACK are associated with each other. Upon receiving such configuration information, the UE 100 selects common resource pool #3 in response to successful reception of the multicast data of TMGI #1, and uses a radio resource included in common resource pool #3 to transmit an ACK to the eNB 200. The eNB 200 determines that the ACK received in common resource pool #3 is an ACK for the corresponding TMGI #1.

Figure 15:
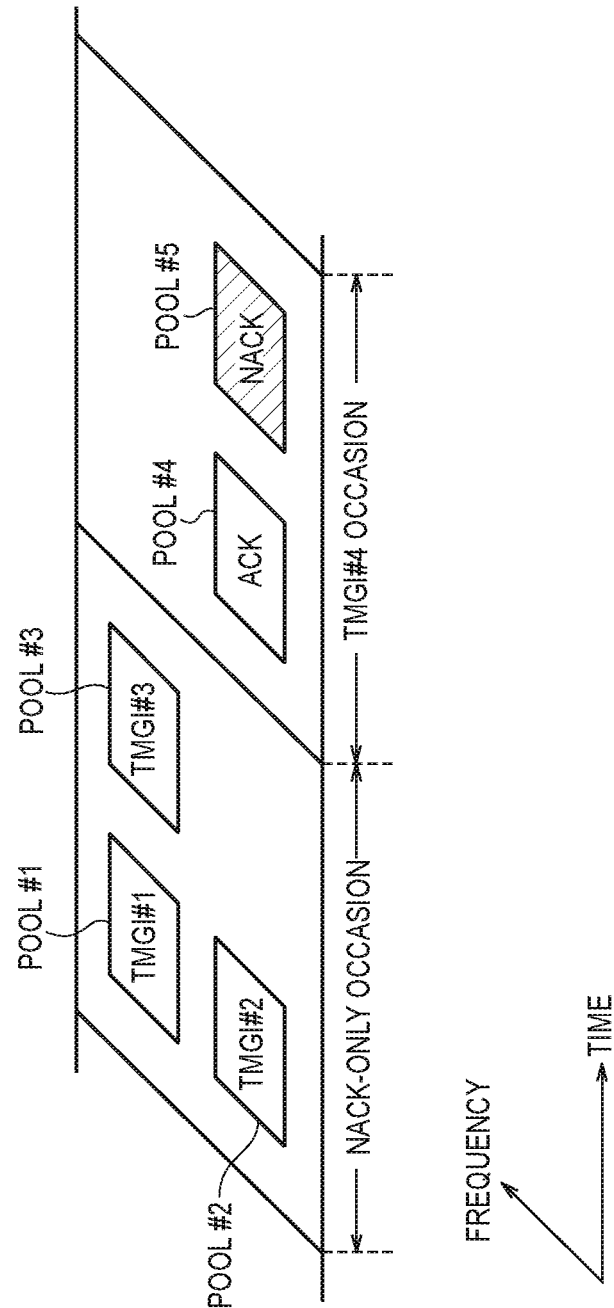
FIG. 15 is a diagram illustrating an example of a common resource pool according to Example 1.

FIG. 15 is a diagram illustrating an example of a common resource pool according to Example 1. In the example illustrated in FIG. 15(a), common resource pools #1 to #3 are reserved. Common resource pools #1 to #3 are reserved corresponding to TMGI #1 to TMGI #3, respectively. Common resource pools #1 to #3 are used for transmission of NACK. In the example illustrated in FIG. 15(b), common resource pools #4 and #5 are reserved. Common resource pools #4 and #5 are reserved corresponding to TMGI #4. Common resource pool #4 is used for transmission of ACK, and common resource pool #5 is used for transmission of NACK. In the example illustrated in FIG. 15, the configuration information (S11) illustrated in FIG. 14 may include, for example, association information between a subframe number and NACKonly feedback, association information between a subframe number and a TMGI, association information between a time section/frequency section in a subframe and a TMGI, and/or association information between a time section/frequency section in a subframe and ACK/NACK.

(2) Example 2

While Example 1 is an example in which a TMGI is identified by using a common resource pool, Example 2 is an example in which a TMGI is identified by using a signal sequence. Example 2 will be described while focusing on a difference from the Example 1. In Example 2, the common resource pool may be a resource pool similar to a resource pool for a physical random access channel (PRACH). The signal sequence may be a random access preamble sequence.

In Example 2, the receiver 110 of the UE 100 receives multicast data belonging to an MBMS service from the eNB 200. The receiver 110 of the UE 100 receives from the eNB 200 configuration information indicating a signal sequence shared by a plurality of UEs 100 to transmit feedback information corresponding to the multicast data to the eNB 200. The configuration information includes information indicating a correspondence relationship between the attribute of the feedback information and the signal sequence. The information indicating the signal sequence may be a cyclic shift applied to the base sequence.

The controller 130 of the UE 100 selects a specific signal sequence to be used for transmission of the feedback information based on the attribute of the feedback information to be transmitted to the eNB 200. The transmitter 120 of the UE 100 transmits the feedback information to the eNB 200 by using the specific signal sequence.

The transmitter 210 of the eNB 200 transmits the multicast data belonging to the MBMS service. The transmitter 210 of the eNB 200 transmits to the UE 100 the configuration information indicating one or more signal sequences shared by the plurality of UEs 100 to transmit the feedback information corresponding to the multicast data to the eNB 200. The receiver 220 of the eNB 200 receives the feedback information transmitted from the UE 100 by using the specific signal sequence. The controller 230 of the eNB 200 determines the attribute of the feedback information received from the UE 100 based on the specific signal sequence.

Figure 16:
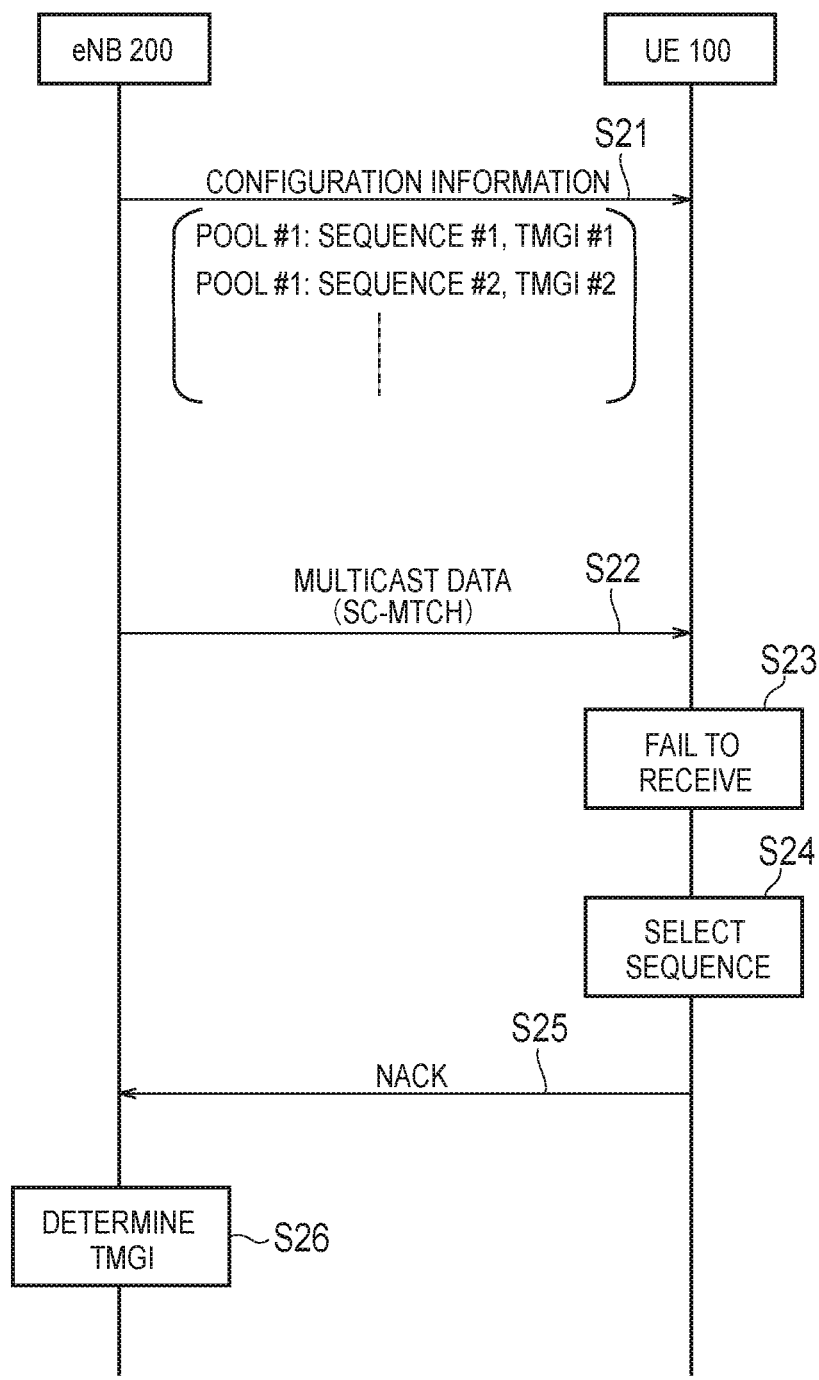
FIG. 16 is a diagram illustrating an operation sequence according to Example 2.

FIG. 16 is a diagram illustrating an operation sequence according to Example 2. In the initial state of FIG. 16, the UE 100 is in the RRC idle mode and is interested in receiving the MBMS service of TMGI #1.

As illustrated in FIG. 16, in step S21, the eNB 200 transmits configuration information indicating a plurality of signal sequences to the UE 100 by broadcast signaling or multicast signaling. The broadcast signaling may be SIB 20. The multicast signaling may be SC-MCCH. The UE 100 receives from the eNB 200 the configuration information to be stored.

The configuration information includes information (mapping information) indicating a correspondence relationship between a common resource pool, a signal sequence, and a TMGI. The TMGI includes a service identifier for identifying an MBMS service. As one example, common resource pool #1, signal sequence #1, and TMGI #1 are associated with each other, and common resource pool #2, signal sequence #2, and TMGI #2 are associated with each other.

In step S22, the eNB 200 transmits multicast data of TMGI #1 via the SC-MTCH. The UE 100 receives the multicast data of TMGI #1 from the eNB 200.

In step S23, the UE 100 detects a decoding error of the multicast data of TMGI #1 and determines that the reception of the multicast data of TMGI #1 has been failed.

In step S24, the UE 100 selects signal sequence #1 corresponding to TMGI #1 based on the configuration information.

In step S25, the UE 100 transmits a NACK to the eNB 200 by using common resource pool #1 and signal sequence #1. The eNB 200 receives the NACK from the UE 100.

In step S26, the eNB 200 determines that the NACK received in signal sequence #1 is a NACK for the corresponding TMGI #1. Based on the NACK, the eNB 200 may perform retransmission of the multicast data of TMGI #1 and/or adjustment of the MCS or the like (that is, link adaptation).

In Example 2, the mapping information in the configuration information may be information indicating a correspondence relationship between a common resource pool, a signal sequence, a TMGI, and ACK/NACK. In this case, in addition to the signal sequence for NACK, a signal sequence for ACK is allocated. As one example, signal sequence #1, TMGI #1, and NACK are associated with each other, and signal sequence #3, TMGI #1, and ACK are associated with each other. Upon receiving such configuration information, the UE 100 selects signal sequence #3 in response to successful reception of the multicast data of TMGI #1, and uses signal sequence #3 to transmit an ACK to the eNB 200. The eNB 200 determines that the ACK of signal sequence #3 is an ACK for the corresponding TMGI #1.

(3) Example 3

Example 3 is an example relating to the transmission timing of feedback information (NACK). Example 3 is implemented in combination with Example 1 and/or Example 2.

In Example 3, the controller 130 of the UE 100 stores in advance a time offset between a reception timing of multicast data and a transmission timing of feedback information. In other words, the time offset is predefined by the system specification. The time offset may be represented by the number of subframes. The transmitter 120 of the UE 100 transmits the feedback information to the eNB 200 at the transmission timing determined according to the time offset. Based on the reception timing of the feedback information, the eNB 200 determines for which multicast data the feedback information is.

In the following, a case where a NACK is transmitted in subframe (n+4) that is the fourth subframe after subframe (n) in which multicast data was received will be mainly described. In response to the configuration information (common resource pool information) being transmitted from the eNB 200, the UE 100 may determine that a feedback resource is prepared (feedback available) at the fourth subframe after the SC-PTM transmission subframe.

Figure 17:
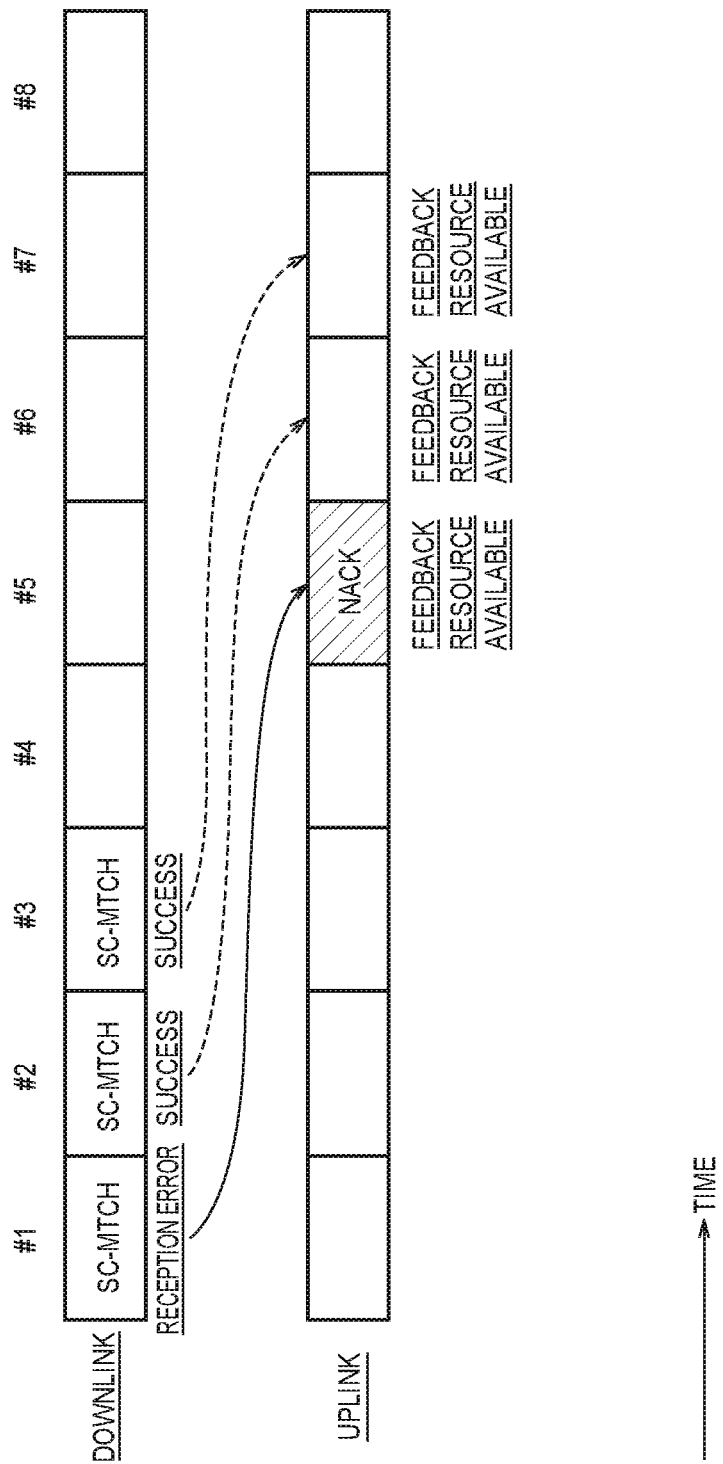
FIG. 17 is a diagram illustrating an operation according to Example 3.

FIG. 17 is a diagram illustrating an operation according to Example 3. As illustrated in FIG. 17, the eNB 200 transmits multicast data (transport block) through SC-MTCH in each of subframes #1 to #3. The UE 100 fails to receive the multicast data of subframe #1 and successfully receives the multicast data of the subframes #2 and #3. The UE 100 transmits a NACK to the eNB 200 by using a radio resource included in the common resource pool in subframe #5 that is the fourth subframe after subframe #1.

(4) Example 4

Example 4 is an example in which Example 3 is improved such that feedback information can be reduced.

In Example 4, the receiver 110 of the UE 100 receives multicast data multiple times within a predetermined period. The controller 130 of the UE 100 generates one piece of feedback information corresponding to the multicast data received multiple times within the predetermined period. The transmitter 120 of the UE 100 transmits the generated one piece of feedback information to the eNB 200. In this way, the UE 100 performs feedback based on whether or not all SC-PTM reception within a certain period has been successful.

Figure 18:
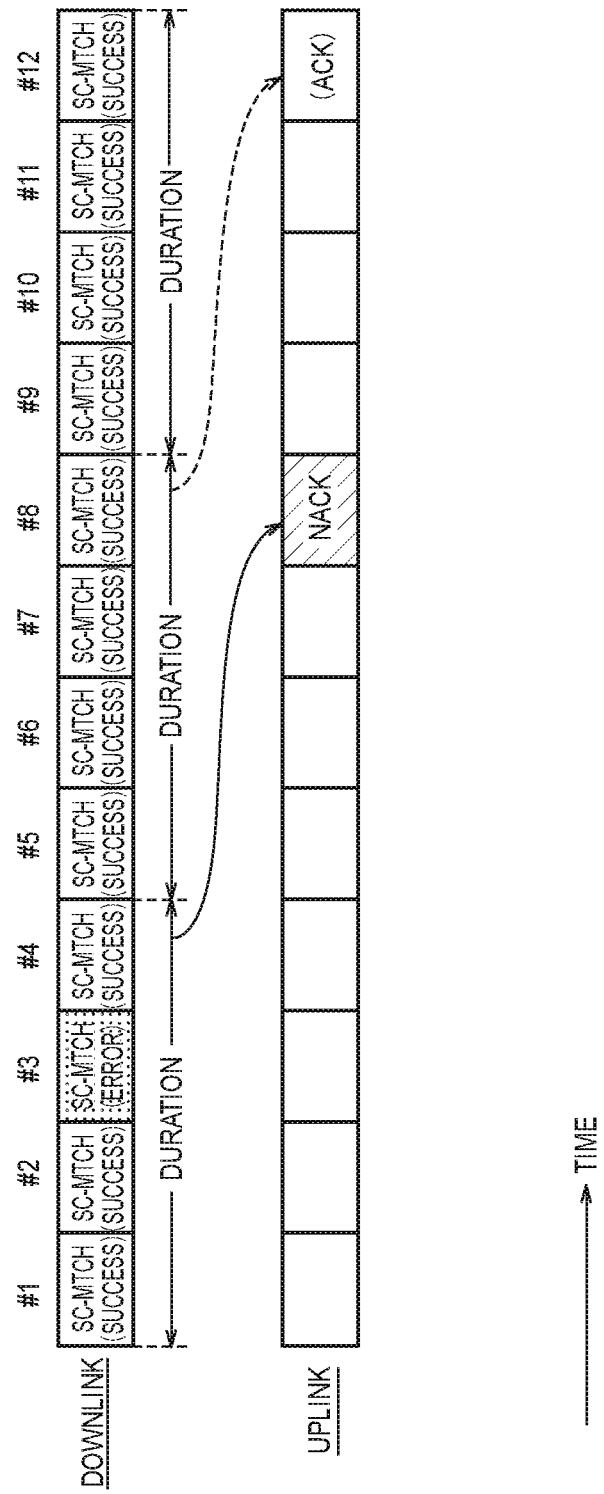
FIG. 18 is a diagram illustrating an operation according to Example 4.

FIG. 18 is a diagram illustrating an operation according to Example 4. As illustrated in FIG. 18, a predetermined period (Duration) including a plurality of subframes is set. The predetermined period may be set in the UE 100 by the eNB 200, or may be predefined according to the system specification. The predetermined period may be represented by a start subframe, an end subframe, a duration (number of subframes), and the like. Here, an example in which the predetermined period is composed of four subframes will be described. In the following, setting for the UE 100 by the eNB 200 is performed by broadcast signaling (for example, SIB), multicast signaling (for example, SC-MCCH), or dedicated signaling (for example, RRC Connection Reconfiguration).

When all the SC-PTM receptions are successful within one predetermined period, the UE 100 does not perform feedback or transmits an ACK. On the other hand, when SC-PTM reception is failed even once within one predetermined period, the UE 100 performs feedback (that is, transmits a NACK). Alternatively, only when SC-PTM reception is failed more than a specified number of times within one predetermined period, the UE 100 may perform feedback. In this case, the specified number of times may be set in the UE 100 by the eNB 200.

In the example of FIG. 18, the UE 100 receives multicast data (SC-MTCH) in each of subframes #1 to #4 corresponding to the predetermined period. The UE 100 fails to receive (decode) the multicast data of subframes #1, #2, and #4 and successfully receives (decodes) the multicast data of subframe #3. The UE 100 transmits a NACK to the eNB 200 in subframe #8 that is the fourth subframe after subframe #4 at which the predetermined period ends. However, when two or more times is set as the specified number of times, the UE 100 does not have to perform feedback.

The UE 100 also receives multicast data (SC-MTCH) in each of subframes #5 to #8 corresponding to the next predetermined period. The UE 100 successfully receives (decodes) the multicast data of subframes #5 to #8. In this case, the UE 100 does not perform feedback. Alternatively, the UE 100 may transmit an ACK to the eNB 200 in subframe #12 that is the fourth subframe after subframe #8 at which the next predetermined period ends.

(5) Example 5

In Example 5, feedback information can be reduced by limiting the number of UEs 100 to be fed back.

In Example 5, the controller 130 of the UE 100 measures the quality of a radio signal (for example, a reference signal) received from the eNB 200. The quality may be a reference signal received power (RSRP), a reference signal received quality (RSRQ), or a reference signal SINR (RS-SINR). The controller 130 of the UE 100 disables the transmission of feedback information (NACK) in response to a value indicative of the quality being equal to or greater than a threshold value. In contrast, the controller 130 of the UE 100 enables the transmission of feedback information (NACK) in response to the value indicative of the quality being less than the threshold value. The threshold value may be set in the UE 100 by the eNB 200.

Here, the value indicative of the quality may be a measured value of the quality or a value derived from the measured value of the quality. As an example, the value indicative of the quality may be a CE (Coverage Enhancement) level based on the RSRP. The UE 100 determines its own CE level according to a comparison result between the RSRP and the threshold value. A list of threshold values is notified from the network to the UE 100, and each of the threshold values may be associated with a CE level. Alternatively, the value indicative of the quality may be the number of repeated transmissions (repetition count) corresponding to the CE level.

(6) Example 6

Example 6 is an example in which an ACK is also fed back only to a specific UE 100 on the premise of NACKonly HARQ feedback. In Example 6, the description overlapping with Example 5 will be omitted.

In Example 6, the controller 130 of the UE 100 measures the quality of a radio signal received from the eNB 200. The controller 130 of the UE 100 disables the transmission of ACK and enables the transmission of NACK in response to a value indicative of the quality being equal to or greater than a threshold value. In contrast, the controller 130 of the UE 100 enables both the transmission of ACK and the transmission of NACK in response to the value indicative of the quality is less than the threshold value. Thus, for the UE 100 under a poor radio condition, the eNB 200 can regard no return of ACK as NACK to perform retransmission.

If an ACK is also fed back, it is preferable that the eNB 200 grasps a UE 100 that feeds back an ACK (for example, a UE 100 having an RSRP of threshold value or less and being interested in SC-PTM reception). This is because there is an implementation that regards no return of ACK as NACK for retransmission, but in this case, it is unclear whether an ACK is not really returned or there is simply no corresponding UE 100.

Accordingly, in Example 6, the transmitter 120 of the UE 100 may further transmit to the eNB 200 information indicating whether or not the value indicative of the quality is equal to or greater than the threshold value.

The transmitter 120 of the UE 100 may implicitly notify the eNB 200 that the value indicative of the quality has become less than the threshold value by transmitting the ACK when the value indicative of the quality becomes less than the threshold value. That information may be transmitted from the UE 100 to the eNB 200 by RRC signaling (or MAC control element, etc.). A resource pool for transmitting that information may be set in the UE 100 by the eNB 200.

Figure 19:
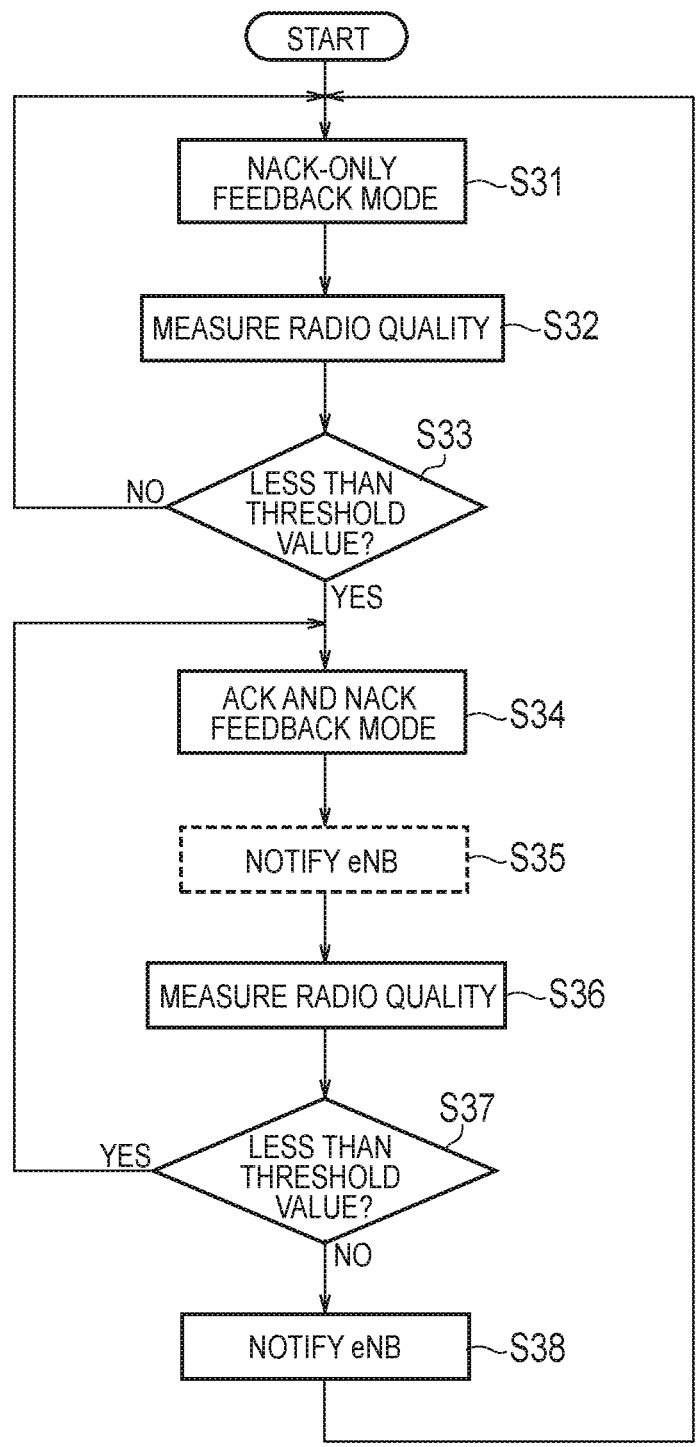
FIG. 19 is a diagram illustrating an operation according to Example 6.

FIG. 19 is a diagram illustrating an operation according to Example 6. In FIG. 19, a mode in which the transmission of ACK is disabled and the transmission of NACK is enabled is denoted as "NACK-only feedback mode", and a mode that both the transmission of ACK and the transmission of NACK are enabled is denoted as "ACK and NACK feedback mode".

As illustrated in FIG. 19, the UE 100 in the NACK-only feedback mode (S31) measures a radio quality (S32) and compares a value indicative of the radio quality with a threshold value (S33). If the value indicative of the radio quality is less than the threshold value (S33: YES), the UE 100 enters the ACK and NACK feedback mode and transmits a notification for that or an ACK to the eNB 200 (S34, S35). If there is even one UE 100 entering, the eNB 200 assumes that there is a possibility that the ACK will be returned, and performs monitoring of the ACK (and retransmission determination using this).

The UE 100 entering the ACK and NACK feedback mode measures a radio quality (S36) and compares a value indicative of the radio quality with a threshold value (S37). If the value indicative of the radio quality is equal to or greater than the threshold value (S37: NO), the UE 100 leaves the ACK and NACK feedback mode and transmits a notification for that to the eNB 200 (S38). The threshold value used in S37 may be the same as the threshold value used in S33, or a different threshold value may be used so as to have hysteresis.

Such an operation can be diverted to the operation when the UE 100 leaves the cell of the eNB 200. Even when the UE 100 performs cell reselection to another cell, the UE 100 may perform the same operation as leaving, that is, transmitting a notification to the eNB 200. The notification may include information for identifying the UE 100. The information for identifying the UE 100 may be an IMSI or a predetermined signal sequence.

(7) Example 7

Example 7 is an example that allows saving resources for feedback by limiting the number of MBMS services for which feedback is to be performed.

In Example 7, the receiver 110 of the UE 100 further receives from the eNB 200 predetermined information indicating an MBMS service in which transmission of feedback information (NACK) is required. The predetermined information may be the TMGI of the MBMS service in which transmission of feedback information is required. Alternatively, the eNB 200 may present to the UE 100 the MBMS service in which transmission of feedback information is required, by notifying the UE 100 of a flag or resource configuration information for each TMGI. Further, the flag or the resource configuration information may specify the type of the feedback. For example, flags indicating the necessity of NACK-only HARQ feedback, the necessity of HARQ feedback (ACK and NACK), the type of feedback as described in the above Examples, and so on are notified. Alternatively, feedback information (for example, resource setting for NACK-only HARQ feedback) corresponding to the type of the feedback is notified. The controller 130 of the UE 100 determines the MBMS service (TMGI) in which transmission of feedback information is required based on the predetermined information. Then, the controller 130 of the UE 100 performs control so that feedback is performed only for the MBMS service (TMGI) in which transmission of feedback information is required.

The eNB 200 determines the number of TMGIs to be fed back based on the upper limit of the radio resources available for feedback. Alternatively, the upper limit of the feedback resource or the upper limit number of the TMGI may be notified from OAM (or CN) to the eNB 200, and the eNB 200 controls the amount of the feedback resource within the upper limit value. As an example, if the number of TMGIs is larger than the number of feedback resources that can be prepared, the eNB 200 determines for which TMGI the feedback is performed. The eNB 200 may use a TMGI which the UE 100 having a high CE level (a large number of repetitions) is interested in receiving, as the feedback target. Alternatively, a TMGI which a large number of UEs 100 are interested in receiving may be the feedback target.

Other Embodiments

In the above-described embodiment, the case where the feedback information is ACK/NACK has mainly been assumed. However, the feedback information may be channel state information (CSI). The CSI includes a CQI (Channel Quality Indicator). The CSI may be a PMI (Precoder Matrix Indicator). The feedback information may be notification information. The notification information is information indicating that the UE 100 desires to prohibit the change of the MCS applied to the SC-PTM. Specifically, the UE 100 transmits to the eNB 200 notification information indicating that the MCS should not be upgraded. The UE 100 may transmit to the eNB 200 notification information indicating that the MCS should not be upgraded with the reception quality of the multicast data being less than a threshold value as a trigger. When the eNB 200 receives from the UE 100 the notification information indicating that the MCS should not be upgraded, the eNB 200 controls not to upgrade the MCS.

On the other hand, when the eNB 200 does not receive from the UE 100 the notification information indicating that the MCS should not be upgraded, the eNB 200 may control to upgrade the MCS. Alternatively, the notification information may be information indicating that the reception quality of the multicast data is less than the threshold value. In this case, whether or not to change the MCS depends on the determination by the eNB 200. Alternatively, the notification information may be information indicating that the UE 100 desires to change the MCS. For example, the UE 100 may transmit to the eNB 200 notification information indicating that the MCS should be upgraded with the reception quality of the multicast data being equal to or greater than the threshold value as a trigger. Alternatively, the notification information may be information indicating that the UE 100 permits the change of the MCS. Alternatively, the notification information may be information indicating that the reception quality of the multicast data is equal to or greater than the threshold value. In this case, whether or not to change the MCS depends on the determination by the eNB 200.

In the above-described embodiment, the LTE system is exemplified as the mobile communication system. However, the present disclosure is not limited to the LTE system. The present disclosure may be applied to a mobile communication system other than the LTE system.

(Supplementary Note)

(1. Introduction)

The necessity of feedback and retransmission for SC-PTM was discussed but no conclusion was made.

In this supplementary note, the details of feedback scheme for link adaptation and retransmission are discussed.

(2. Discussion)

(2.1. Background)

The simulation evaluation of spectral efficiency with feedback and link adaptation/retransmission was performed by multiple vendors for the eMBMS discussion in 2007. It was explicitly concluded that "Comparing different approaches to single-cell transmission, ptm including possibility for (group-specific) adaptation and retransmissions is always more efficient than ptp and the gains could be significant (>100%) at a high number of users within the cell. Single-cell ptm without the possibility for adaptation and retransmissions is significantly less efficient, compared to ptp, for low user densities."

Observation 1: Link adaptation and retransmission are beneficial for better spectral efficiency.

In Rel-13 SC-PTM study, the same discussion was also held, and RAN2 was answered by RAN1 that "RAN1 has only considered the case where CSI and HARQ or HARQ only feedback is provided by all UEs receiving SC-PTM and all UEs receiving SC-PTM are in RRC_CONNECTED state. CSI and/or HARQ-ACK feedback can bring gain in the considered case." The TR captured some remarkable conclusions such as "SC-PTM with UL feedback provides better spectral efficiency than unicast if the service needs to be delivered to two or more UEs per cell". But it was not specified since "It has not been concluded whether the gains provided by HARQ and retransmission are worth of the increased complexity of the system" in the study phase.

In Rel-14 V2X study, the TR captured that "For DL multicast/broadcast, RAN1 has observed performance benefit with the following enhancements: HARQ feedback, CSI feedback". Once the study concluded that "It is recommended to support the following solutions identified in this TR for Uu-based V2X: HARQ feedback and retransmissions for SC-PTM and MBSFN, with necessary additional study", it was eventually excluded from the scope of the follow-up working item.

Observation 2: Rel-13/14 studies reconfirmed the UL feedback has performance gains in terms of spectral efficiency and capacity, while the necessity of further study was identified.

The discussion was initiated, but the problem was a bit different from the past, i.e., between FeMTC/eNB-IoT and legacy LTE, or between multicast-type service, e.g., firmware delivery and broadcast-type service, e.g., voice streaming. The points which justify the feedback and retransmission in Rel-14 are as follows.

The probability of retransmission via Unicast increases significantly, e.g., 12.2 times higher than legacy LTE due to limitation of TBS, which also affects to UE power consumption.

The retransmission packet size via Unicast becomes much bigger than the failed packet, due to limitation of TBS or by re-acquisition of entire firmware with a upper layer retransmission, which causes unnecessary battery consumption.

Too much blind repetition or no opportunity for link adaptation forces the system in the worst spectral efficiency.

In addition, the following issue could come up since RAN2 agreed that "Reception of multi-cast in RRC_IDLE mode is required by both NB-IoT and MTC" and "Reception of multi-cast in RRC_CONNECTED mode is not required for NB-IoT and FFS for MTC", i.e., to assume only UEs in RRC IDLE receive SC-PTM.

If relying on an application level retransmission, many of requests for RRC connection establishment/resumption happens simultaneously/continuously.

Also, the corresponding signalling exchanges over Uu are needed before the retransmission.

Observation 3: The UE power consumption is degraded with inefficient retransmission, e.g., with application layer.

From the perspectives of UE power consumption, spectral efficiency and NW congestion, there is no technical reason to exclude the introduction of feedback and retransmission in AS layer for Rel-14 multicast enhancements, even if the other observation is also true, i.e., TU limitation in this WI.

Proposal 1: RAN2 should decide to introduce the UL feedback and DL retransmission in AS layer as a multicast enhancement.

(2.2. Feedback Scheme)

(2.2.1. General)

The UL feedback referred in the TR was both CSI feedback and HARQ feedback. In terms of the spectral efficiency, the best performance is observed with both CSI feedback and HARQ feedback and the sub-optimal performance is achieved with either CSI feedback only or HARQ feedback only. Considering the signalling overhead, the feedback with both CSI and HARQ is not preferable. In addition, HARQ feedback (i.e., 1 bit) is more efficient than CSI feedback (i.e., 4 bits for CQI and optionally PMI+PTI+RI). Also, the HARQ feedback is used for not only link adaptation but also retransmission as discussed in section 2.1, HARQ feedback is straight forward for the multicast enhancements.

Proposal 2: RAN2 should assume HARQ feedback is used for link adaptation and/or retransmission of Rel-14 SC-PTM.

On the other hand, the challenge of HARQ feedback for SC-PTM is how to facilitate the feedback from IDLE UEs, based on the agreement that "Reception of multi-cast in RRC_IDLE mode is required by both NB-IoT and MTC". In other words, the current UL feedback is provided within PUCCH or PUSCH, while no dedicated resource is allocated for the UE in RRC IDLE.

Observation 4: HARQ feedback from IDLE UEs without dedicated resources needs to be addressed.

Also, some interesting characteristics could be observed as follows.

"Multipoint-to-point" feedback: The multiple feedbacks come from multiple UEs for a single DL data. Considering the possibility of large number of UEs, e.g., mMTC, the number of UL signalling is problematic since it may be increased with {(# of TMGIs)×(# of TBs)×(# of UEs)}.

"Anonymous" feedback: The serving cell may not need to distinguish who sends the feedback, i.e., the link adaptation and/or retransmission could be decided only with the knowledge of TMGI and TB associated to the feedback, since e.g., there is no difference between only one NACK and many NACKs to initiate the retransmission.

Observation 5: The number of HARQ feedbacks increases with the number of UEs receiving SC-PTM.

Observation 6: HARQ feedback for multicast is not required to identify the sender UE.

(2.2.2. Details)

Some options of HARQ feedback for multicast are identified in V2X study as follows.

In the event that HARQ feedback for DL multicast/broadcast transmissions were to be introduced, at least in a single cell, two options are identified for HARQ feedback resource allocation.

UE-common resource: Multiple UEs receiving the same DL multicast/broadcast transmission transmit HARQ feedback on the same resource.

UE-specific resource: Different UEs receiving the same DL multicast/broadcast transmission transmit HARQ feedback on different resources.

In the sense of the observations in section 2.2.1, the concept with "UE-common resource" should be the baseline of feedback for FeMTC/eNB-IoT multicast.

Proposal 3: RAN2 should assume a common resource is allocated among multiple UEs for a feedback of multicast.

The transmission from IDLE UE is not a new concept. For example, PRACH transmission before RRC connection establishment is allowed from Rel-8, Sidelink transmission in IDLE is specified in Rel-12 and CE level reporting with different PRACH resource during initial access is introduced in Rel-13. So, the feedback scheme should reuse the existing concepts/specifications as much as possible. For example, the common resource may be similar to the concept of both/either Rel-13 CE level reporting, i.e., PRACH-ParametersListCE-r13, and/or the Rel-12 resource pool, e.g., discTxPoolCommon-r12.

Observation 7: The UE-common resource may be depicted as Rel-13 PRACH resources per CE level or Rel-12 resource pool for sidelink, as the starting point.

As discussed in section 2.2.1, the serving cell needs to distinguish TMGI and TB (Transport Block) associated with a HARQ feedback, although there is no need to know who transmit it. One approach is time-domain mapping as it is today, i.e., HARQ feedback is sent in subframe n+4 (i.e., 4 ms after the data reception). It's reused to distinguish TB.

Proposal 4: RAN2 should consider that HARQ feedback is transmitted in subframe n+4 to distinguish each transport block (or HARQ process), as it is today.

Regarding how to distinguish TMGI from HARQ feedback, there could be two alternatives as follows.

Alt.1: Different signals; For example with PRACH, different preambles are mapped to different TMGIs.

Alt.2: Different radio resources; For example with the resource pool for sidelink, different pools are mapped to different TMGIs.

The number of TMGIs supported may be limited to the available resources, i.e., how many preambles (Alt.1) or how much resources can be provided for the feedback. From the standardization point of view, Alt.1 needs to involve RAN1, while Alt.2 may be decided in RAN2.

Proposal 5: RAN2 should discuss whether each TMGI is distinguished by different signals, e.g., preambles, or different radio resources, e.g., feedback pools.

The existing HARQ feedback for Unicast consists of ACK and NACK. The ACK/NACK is beneficial to ensure the successful data delivery, accurate link adaptation and so on. Considering ACK is most of the cases and many UEs receive SC-PTM, however, the number of HARQ feedback is significantly increased as discussed in Observation 5.

To avoid such a massive feedbacks, NACK-only feedback was suggested in Rel-13 SC-PTM study. With this method, the UE only send HARQ feedback, i.e., NACK, when it fails to receive SC-PTM. In other words, the UE doesn't send any feedback during SC-PTM is successfully received. Needless to say, less UL signalling minimizes the UE power consumption.

Proposal 6: RAN2 should discuss whether NACK-only feedback is beneficial to limit the number of HARQ feedbacks.

Figure 20:
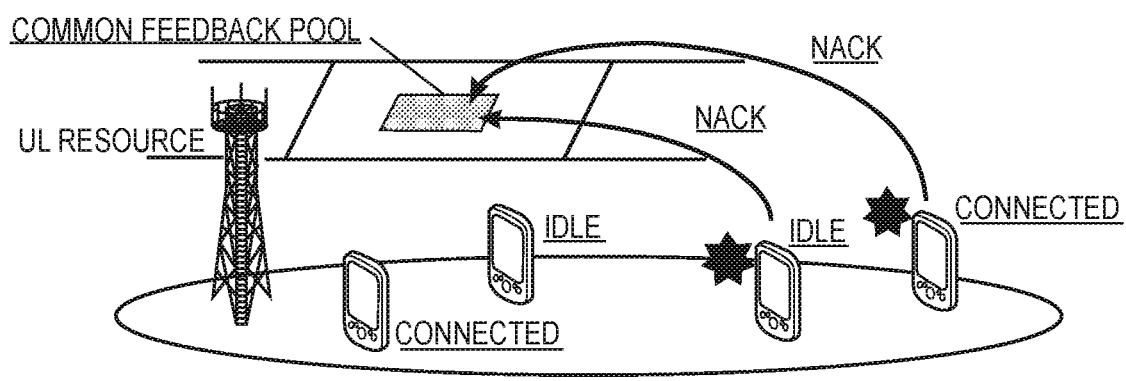
FIG. 20 is a diagram according to supplementary note.

Example of NACK-only HARQ feedback with common resource is shown in FIG. 20.

(2.2.3. Further Optimizations (if Time Allows))

In this section, some of further optimizations for HARQ feedback are discussed.

If the ACK feedback is still beneficial for SC-PTM e.g., to ensure the successful delivery as it is for Unicast, it's worth discussing how to minimize the number of feedbacks. As one of possibilities, it may be considered to bundle multiple feedbacks for multiple TBs within one feedback, i.e., feedback bundling. With this optimization, the UE sends ACK if all SC-PTM transmissions are successfully received in a certain duration. Otherwise (i.e., even if only one SC-PTM is failed to decode), it sends NACK. Alternatively, it may also be beneficial and efficient for only a subset of UEs in poor coverage, e.g., "RSRP<a configured threshold", to send ACKs, while all UEs would continue send NACKs. With this alternative, the eNB may ensure the successful packet delivery of the most problematic UEs, without requiring all UEs to send ACKs in order to avoid excessive amount of overhead. However, the ACK feedback may have some complexity, compared to NACK-only feedback, i.e., Proposal 6. For example, it may require the same level of control for Unicast, e.g., at least the eNB will need to know if any UE are located within the specified poor coverage region whereby ACKs would be sent, since the eNB may decide to perform retransmission when no ACK nor NACK feedback is received, if it's based on the same principle as the Unicast's feedback mechanism.

As another optimization, if the NACK-only feedback is identified beneficial in Proposal 6, one of additional feedback could be considered for better link adaptation. For example, the UE may send the feedback to request the serving cell to keep the current MCS/repetitions. In other words, it's sent when the UE expects it will not be able to decode the SC-PTM with higher MCS/lower repetitions. With the combination of NACK and this feedback, the serving cell may maximize the spectral efficiency without unnecessary reception failure, e.g., retransmission.

Proposal 7: RAN2 should consider whether further optimizations are necessary for HARQ feedback, if time allows.

(2.3. Link Adaptation and Retransmission)

The link adaptation is basically up to NW implementations, whereby CSI feedback and HARQ feedback are assumed as inputs of the algorithm for Unicast scheduling. For the multicast scheduling, too much precise information such as CSI feedback may not be useless, since the channel conditions of multiple UEs are anyway different, i.e., the multicast transmission may not be optimized for a specific channel. So, HARQ feedback is enough for the link adaptation, as consistent with Proposal 2. On the other hand, the dynamic scheduling with PDCCH is still beneficial to align with the "group" condition varied time-by-time, which is also in-line with the agreement that "RAN2 assumes that the legacy SC-MTCH mechanism in which the SC-MTCH is scheduled by PDCCH is reused for multi-cast in NB-IoT and MTC to achieve flexible scheduling".

With regard to the retransmission, HARQ feedback is the essential and direct information as well. Considering the asynchronous retransmission in DL, the dynamic scheduling with PDCCH provides the better handling of such a scheduling. Also, the NDI (New Data Indicator) in PDCCH avoids the duplicate receptions of SC-PTM when a UE already decode it successfully, i.e., the UE does not need to receive the retransmission for another UE.

Observation 8: Dynamic scheduling of SC-MTCH, i.e., with (M/N) PDCCH, is beneficial, if the link adaptation and/or retransmission is assumed for SC-PTM.

[Cross Reference]

The entire contents of U.S. Provisional Application No. 62/397,459 (filed Sep. 21, 2016) are hereby incorporated by reference.

INDUSTRIAL APPLICABILITY

The present disclosure is useful in the mobile communication field.

The invention claimed is:

1. A radio terminal configured to receive multicast data belonging to a Multimedia Broadcast Multicast Service (MBMS) service from a base station, the radio terminal comprising:
   a receiver configured to receive configuration information indicating one or more common resource pools shared by a plurality of radio terminals to transmit, to the base station, feedback information corresponding to the multicast data, the configuration information including information indicating a correspondence relationship between an attribute of the feedback information and a common resource pool and/or a signal sequence;
   a controller configured to select a specific common resource pool used for transmission of the feedback information and/or a specific signal sequence used for transmission of the feedback information, based on the attribute of the feedback information to be transmitted to the base station and the correspondence relationship; and
   a transmitter configured to transmit the feedback information to the base station by using the specific common resource pool and/or the specific signal sequence,
   wherein the feedback information is ACK/NACK indicating success or failure of the reception of the multicast data,
   the controller is configured to
      measure a quality of a radio signal received from the base station,
      disable transmission of the ACK and enables transmission of the NACK in response to a value indicative of the quality being equal to or greater than a threshold value, and
      enable both the transmission of the ACK and the transmission of the NACK in response to the value indicative of the quality being less than the threshold value,
   the controller is configured to store, in advance, a time offset between a reception timing of the multicast data and a transmission timing of the feedback information, and
   the transmitter is configured to transmit the feedback information to the base station at the transmission timing determined according to the time offset.

2. The radio terminal according to claim 1, wherein the feedback information includes a NACK indicating that reception of the multicast data is failed.

3. The radio terminal according to claim 1, wherein the attribute includes identification information of the MBMS service to which the multicast data belongs.

4. The radio terminal according to claim 1, wherein the receiver is configured to receive the multicast data multiple times within a predetermined period,
   the controller is configured to generate one piece of feedback information corresponding to the multicast data received multiple times within the predetermined period, and
   the transmitter transmits the one piece of feedback information to the base station.

5. The radio terminal according to claim 1, wherein the controller is configured to
   disable the transmission of the feedback information in response to a value indicative of the quality being equal to or greater than a threshold value, and
   enable the transmission of the feedback information in response to the value indicative of the quality being less than the threshold value.

6. The radio terminal according to claim 1, wherein the transmitter is further configured to transmit information indicating whether or not the value indicative of the quality is equal to or greater than a threshold value to the base station.

7. The radio terminal according to claim 1, wherein the receiver is further configured to receive, from the base station, predetermined information indicating the MBMS service in which transmission of the feedback information is required, and
   the controller is configured to determine the MBMS service in which transmission of the feedback information is required based on the predetermined information.

* * * * *